US008997569B2

(12) United States Patent
Narita et al.

(10) Patent No.: US 8,997,569 B2
(45) Date of Patent: Apr. 7, 2015

(54) COMPOUND SENSOR

(75) Inventors: Katsutoshi Narita, Miyoshi (JP); Hidehiko Yamaoka, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 678 days.

(21) Appl. No.: 13/241,942

(22) Filed: Sep. 23, 2011

(65) Prior Publication Data

US 2012/0013355 A1    Jan. 19, 2012

Related U.S. Application Data

(63) Continuation of application No. PCT/JP2010/060227, filed on Jun. 16, 2010.

(51) Int. Cl.
*G01R 27/26* (2006.01)
*G01C 19/574* (2012.01)
*G01P 3/22* (2006.01)
*G01P 15/08* (2006.01)
*G01P 15/125* (2006.01)
*G01P 15/14* (2013.01)
*G01P 15/18* (2013.01)

(52) U.S. Cl.
CPC ............... *G01C 19/574* (2013.01); *G01P 3/22* (2013.01); *G01P 15/0888* (2013.01); *G01P 15/125* (2013.01); *G01P 15/14* (2013.01); *G01P 15/18* (2013.01); *G01P 2015/0805* (2013.01)

(58) Field of Classification Search
CPC ... G01P 15/18; G01P 15/125; G01P 15/0802; G01P 15/123; G01P 15/0891

USPC ....................................................... 73/514.01
See application file for complete search history.

(56) References Cited

U.S. PATENT DOCUMENTS

| 5,554,806 | A | * | 9/1996 | Mizuno et al. | ................... | 73/493 |
| 5,959,206 | A | | 9/1999 | Ryrko et al. | | |
| 6,122,961 | A | | 9/2000 | Geen et al. | | |
| 2006/0230830 | A1 | * | 10/2006 | Geen et al. | ................. | 73/514.29 |
| 2006/0272411 | A1 | | 12/2006 | Acar et al. | | |
| 2010/0116050 | A1 | | 5/2010 | Wolfram | | |

FOREIGN PATENT DOCUMENTS

| JP | 8-68637 | 3/1996 |
| JP | 10-511775 | 11/1998 |

(Continued)

*Primary Examiner* — Hezron E Williams
*Assistant Examiner* — Xin Zhong
(74) *Attorney, Agent, or Firm* — Finnegan, Henderson, Farabow, Garrett & Dunner, LLP

(57) ABSTRACT

A compound sensor includes a first unit including first and second oscillators symmetrically disposed to each other and being able to be displaced in a driving direction and a detecting direction; a second unit including third and fourth oscillators symmetrically disposed to each other and being able to be displaced in the driving direction and the detecting direction; a drive unit to drive the first through fourth oscillators so as to oscillate the first and second oscillators in opposite phase, and the third and fourth oscillators in opposite phase, and so as to oscillate the first and second unit in opposite phase; and a detection unit configured to detect displacements of the first through fourth oscillators in the detecting direction, wherein an acceleration, angular rate, angular acceleration and centrifugal force are independently detected by canceling unnecessary inertial force components from the displacements of the first through fourth oscillators.

4 Claims, 23 Drawing Sheets

(56) References Cited

FOREIGN PATENT DOCUMENTS

| JP | 11-101816 | 4/1999 |
| JP | 2000-180174 | 6/2000 |
| JP | 2001-515201 | 9/2001 |
| JP | 2004-28869 | 1/2004 |
| JP | 3512004 | 1/2004 |
| JP | 2008-14727 | 1/2008 |
| JP | 2008-537114 | 9/2008 |
| JP | 2010-8300 | 1/2010 |

* cited by examiner

DETECTING DIRECTION
→ DRIVING DIRECTION
ANGULAR RATE

FIG.3B

| KIND OF FORCE | ARROW EXPRESSION IN FIG. 3A (DIRECTION, MAGNITUDE) | CALCULATION METHOD OF EACH FORCE |
|---|---|---|
| GENERATIVE FORCE Fr DUE TO ANGULAR RATE | ⇧ | (F1+F4)−(F2+F3) |
| GENERATIVE FORCE Fa DUE TO ACCELERATION | ⇧ | (F1+F2)+(F3+F4) |
| GENERATIVE FORCE Fra DUE TO ANGULAR ACCELERATION | ⇧ | (F1+F3)−(F2+F4) |
| CENTRIFUGAL FORCE Fc | ⇧ | (F1+F2)−(F3+F4) |
| SENSOR DRIVING FORCE V | ⇦ | − |
| EACH DETECTION MASS DETECTING DIRECTION TOTAL FORCE F | ⇧ | − |

FIG.4A
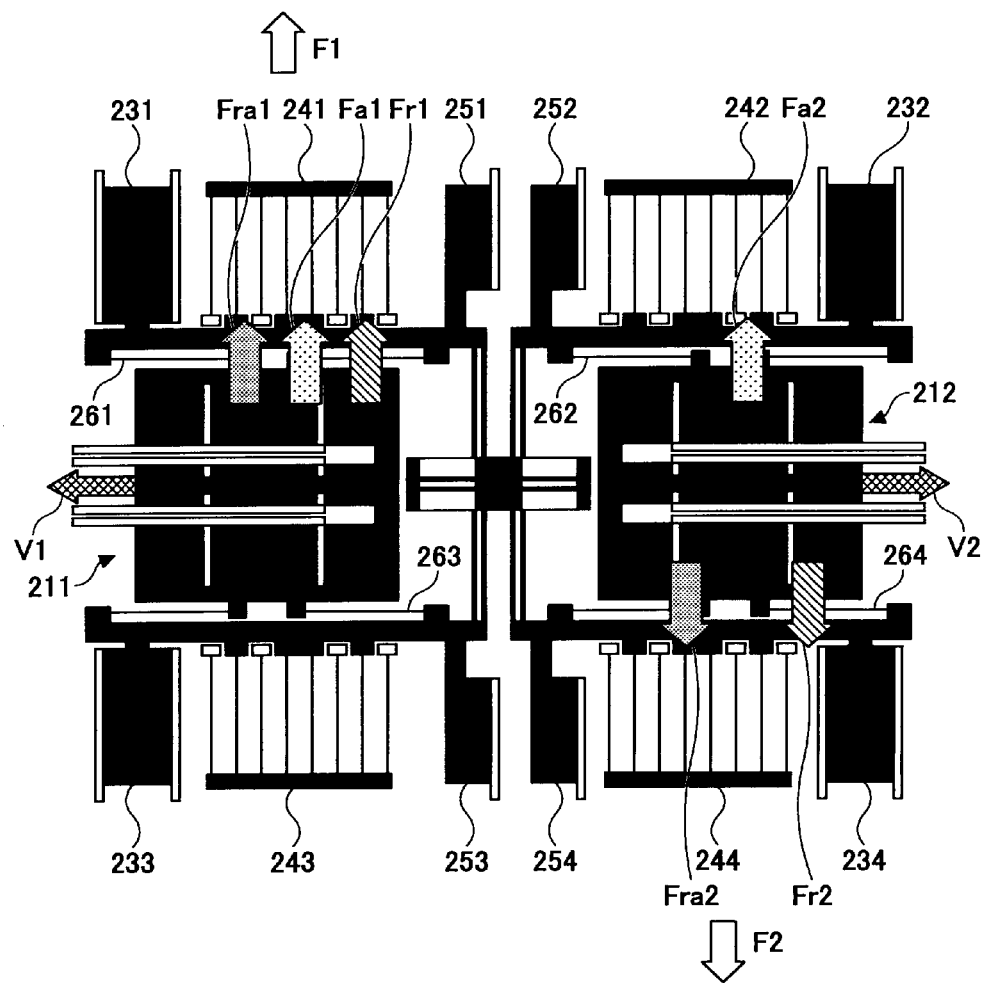
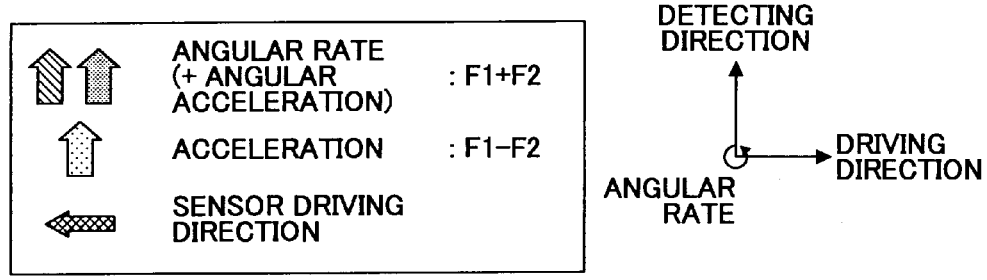

FIG.4B
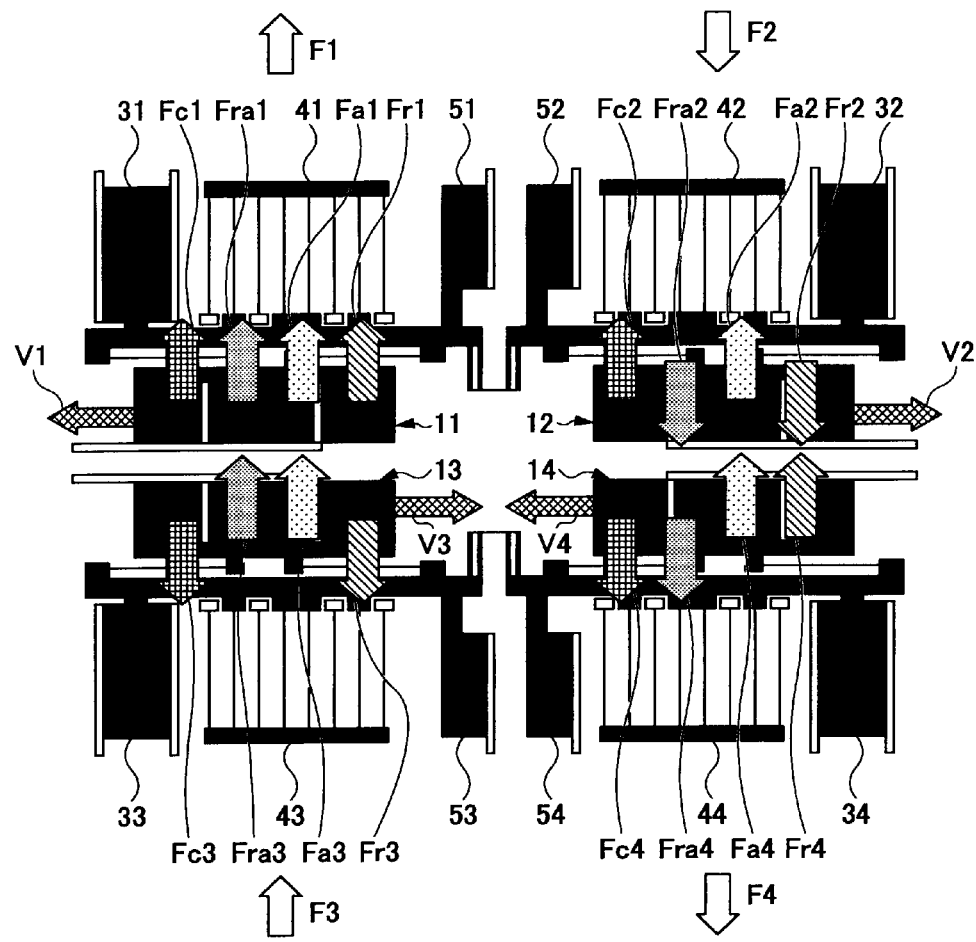
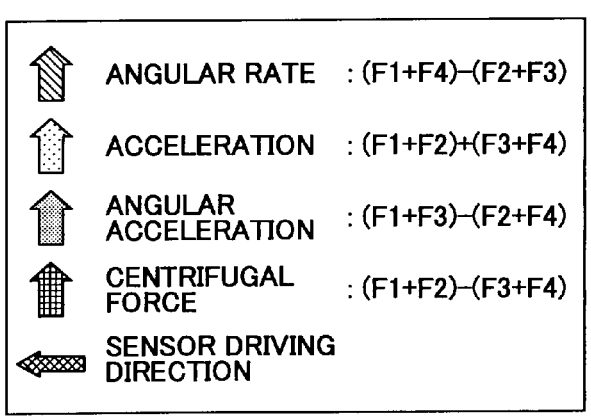
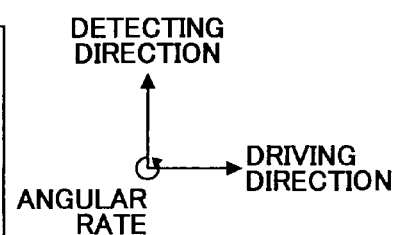

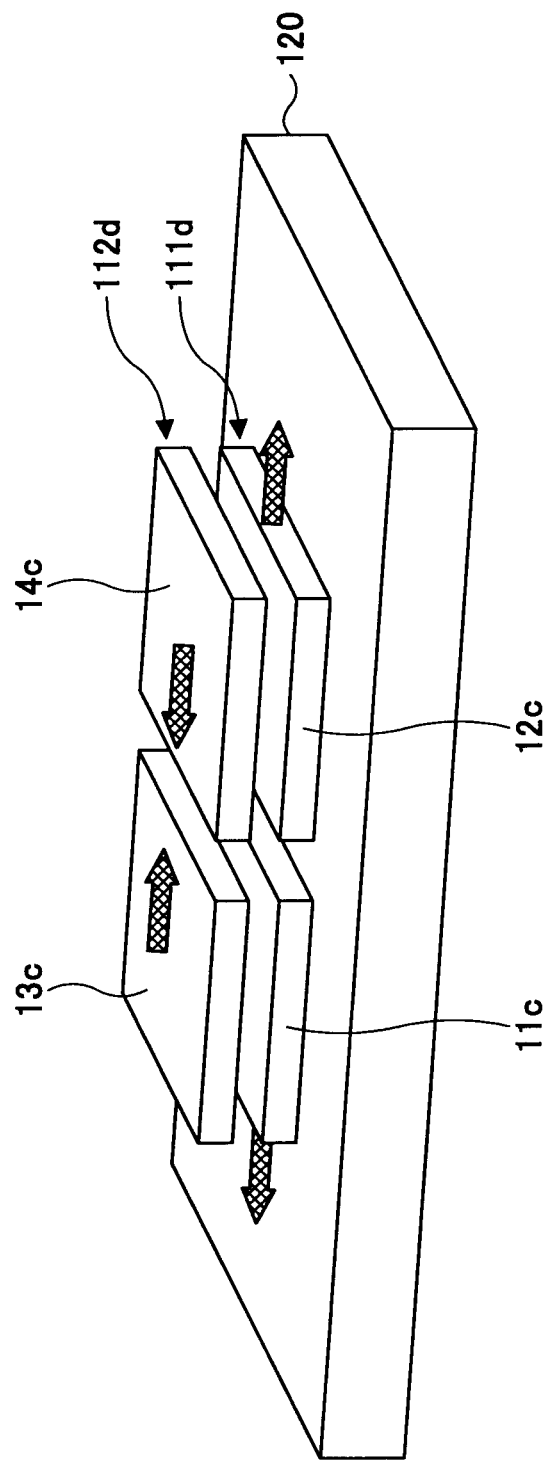

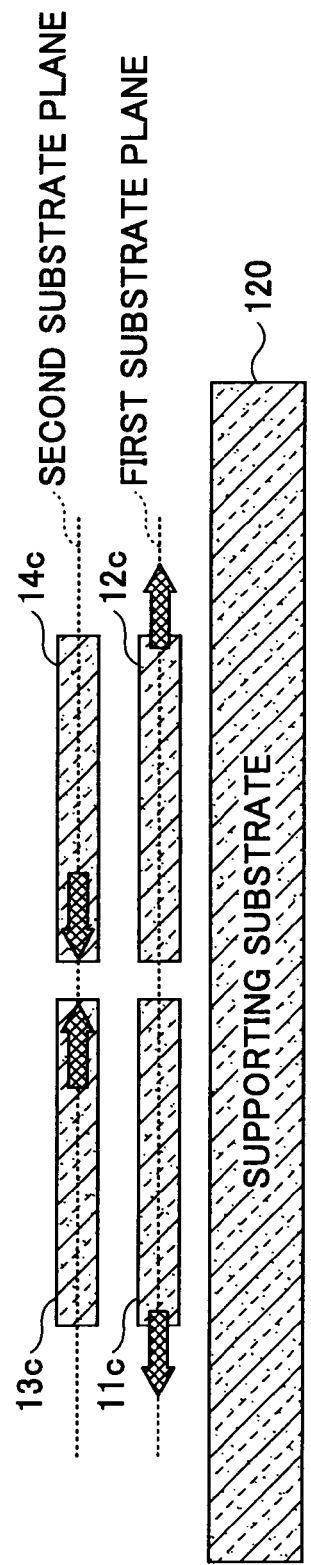

FIG.13B
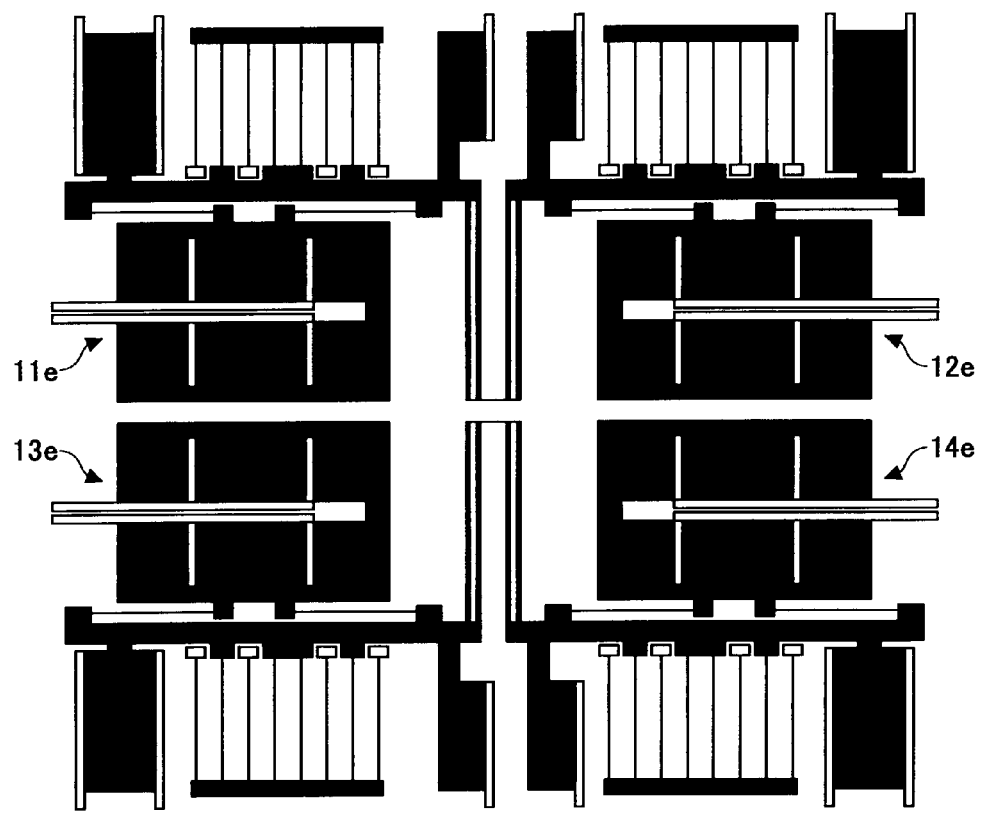
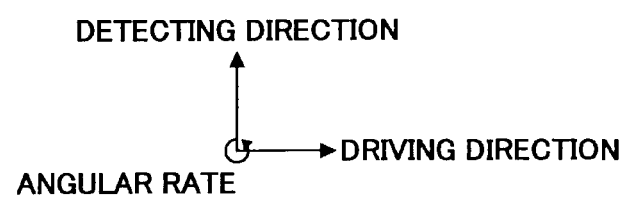

COMPOUND SENSOR

CROSS-REFERENCE TO RELATED APPLICATIONS

The present application is a U.S. continuation application filed under 35 U.S.C. 111 (a) and 356 (c) of PCT application No. PCT/JP2010/60227, filed Jun. 16, 2010. The foregoing application is hereby incorporated herein by reference.

TECHNICAL FIELD

The present invention generally relates to compound sensors, and more specifically, to a compound sensor including oscillators capable of being displaced in a driving direction and a detecting direction.

BACKGROUND ART

Conventionally, an angular rate sensor is known where four oscillators are symmetrically arranged with respect to a predetermined point in a horizontal plane of a substrate, and a sensing electrode is provided for each oscillator, as disclosed in Japanese Published Unexamined Patent Application No. 2000-180174 (which is hereinafter called Patent Document 1). In the angular rate sensor, all adjacent oscillators are driven and oscillated in opposite phase of a circumferential direction centered around the predetermined point, and if an angular rate occurs around an axis perpendicular to the substrate, detecting masses of respective oscillators are displaced in a direction perpendicular to a driving oscillation. A Coriolis signal is taken out by calculating and processing capacitance change between the detecting masses and the oscillators, and by cancelling external acceleration acting on each of the detecting masses in the horizontal plane of the substrate.

However, in a configuration of the angular rate sensor disclosed in Patent Document 1, because a centrifugal force is applied in a detecting axial direction, the centrifugal force has to be cancelled in order to detect an exact angular rate. However, no measures are implemented on this point, and it is difficult to detect the exact angular rate.

Moreover, the angular rate sensor is frequently used by being mounted on a mobile object such as a vehicle, where the angular rate sensor is often mounted on an elastic member such as a dumper in order to remove vibration and the like different from vehicle motion. In such a case, if the dumper becomes deformed, the angular sensor itself vibrates and rotates, which makes it difficult to detect the exact angular rate.

SUMMARY OF INVENTION

Accordingly, embodiments of the present invention may provide a novel and useful compound sensor solving one or more of the problems discussed above.

More specifically, the embodiments of the present invention may provide a compound sensor capable of excluding an inertial force other than a detecting object and capable of detecting a component of the detecting object with a high degree of accuracy.

One aspect of the present invention may be to provide a compound sensor including:

a first unit including first and second oscillators symmetrically disposed to each other and being able to be displaced in a driving direction and a detecting direction;

a second unit including third and fourth oscillators symmetrically disposed to each other and being able to be displaced in the driving direction and the detecting direction;

a drive unit configured to drive the first, second, third and fourth oscillators so as to oscillate the first and second oscillators in opposite phase to each other, and the third and fourth oscillators in opposite phase to each other, and so as to oscillate the first unit and the second unit in opposite phase to each other; and a detection unit configured to detect displacements of the first, second, third and fourth oscillators in the detecting direction.

Other objects, features, and advantages of the present invention will become more apparent from the following detailed description when read in conjunction with the accompanying drawings.

According to embodiments of the present invention, it is possible to detect a component intended to be detected with a high degree of accuracy, by separating the component from the other components.

BRIEF DESCRIPTION OF DRAWINGS

FIG. 3B is a table showing a calculating method of generative forces due to an angular rate, acceleration and angular acceleration and a centrifugal force from resultant forces F1 through F4 of FIG. 3A;

FIG. 4A is a view showing an example of a configuration of a conventional compound sensor as a reference example for comparison;

FIG. 4B is a view showing the compound sensor of the first embodiment in a format similar to FIG. 4A;

FIG. 10A is a view showing an example of a configuration of a compound sensor of a fifth embodiment of the present invention;

FIG. 10B is a view showing an example of a cross-sectional configuration of the compound sensor of the fifth embodiment of the present invention;

FIG. 13B is a view showing a whole configuration of a compound sensor including an increased number of oscillators from the angular rate/acceleration sensor of FIG. 13A;

Figure 1:
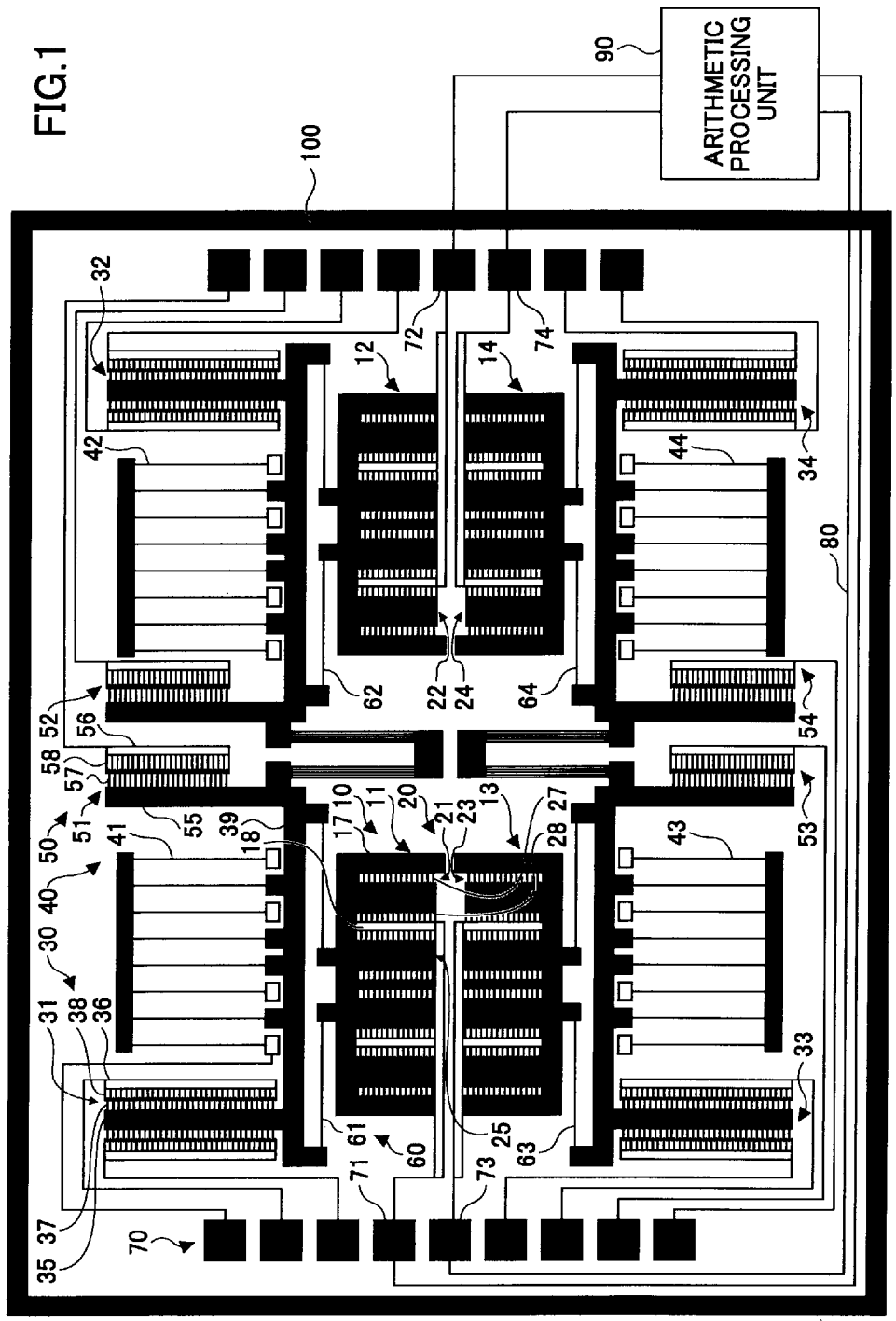
FIG. 1 is a view showing an example of a whole configuration of a compound sensor of a first embodiment of the present invention.

EXPLANATION FOR REFERENCE NUMBERS 10, 11 to 14, 11a, 12a, 12b, 14b, 11c to 14c, 11d to 14d, 11e to 14e, 15, 16 Oscillator
20, 21 to 24, 21a to 24a, 21b to 24b, 21c to 24c Detection part
30, 31 to 34, 31a to 34a Drive part
40, 41 to 44 Drive spring
50, 51 to 54 Drive monitoring part
60, 61 to 64 Detection spring
70, 71 to 74 Terminal
80 Interconnection
90 Arithmetic processing unit
100 Frame
111, 111a to 111d, 112, 112a to 112d Unit
120 Supporting substrate

BEST MODE FOR CARRYING OUT THE INVENTION

A description is given below, with reference to drawings of embodiments of the present invention.

[First Embodiment]

FIG. 1 is a plane view showing an example of a whole configuration of a compound sensor of a first embodiment of the present invention. In FIG. 1, the compound sensor of the first embodiment includes an oscillator unit 10, a detection unit 20, a drive unit 30, a drive spring unit 40, a drive monitoring unit 50, a detection spring unit 60, a terminal unit 70, interconnections 80, an arithmetic processing unit 90 and a frame 100.

The oscillator unit 10 includes four symmetrically arranged oscillators 11 to 14. More specifically, a first oscillator 11, a second oscillator 12, a third oscillator 13 and a fourth oscillator 14 are respectively provided at the left upper side position, at the right upper position, at the left lower side position and at the right lower side position of FIG. 1. Here, the detection unit 20, the drive unit 30, the drive spring unit 40, the drive monitoring unit 50, the detection spring unit 60 and the terminal unit 70 are respectively provided corresponding to the first, second, third and fourth oscillators 11 to 14. In other words, the detection unit 20 includes the first, second, third and fourth detection parts 21, 22, 23, 24. In a similar way, the drive unit 30 includes the first through fourth drive parts 31 to 34; the drive spring unit 40 includes the first through fourth drive springs 41 to 44; the driving monitoring unit 50 includes the first through fourth monitoring parts 51 to 54; the detection spring unit 60 includes the first through fourth detection springs 61 to 64; and the terminal unit 70 includes first through fourth detection terminals 71 to 74. Also, with respect to the terminal unit 70, numerals are put only to the detection terminals 71 to 74 coupled to detection parts 21 to 24, not to all detection terminals.

In descriptions hereinafter, if the first, second, third and fourth oscillators 11, 12, 13, 14 are individually specified, the numerals 11 to 14 respectively put to the oscillators 11 to 14 may be used, but if a generic term of the oscillators or one of unspecified oscillators is indicated without particularly specifying the positions, the oscillators 11 to 14 may be represented as the oscillator unit 10 or an oscillator 10. Similar indication methods may be applied to the other detection unit 20, drive unit 30, drive spring unit 40, drive monitoring unit 50 and detection spring unit 60. Moreover, with respect to more specific components corresponding to parts of the oscillator unit 10, detection unit 20, drive unit 30 and monitoring unit 50, because of space limitations, numerals may be put to only the first oscillator 11, first detection part 21, first drive part 31 and first monitoring part 51 on the left upper side in FIG. 1. Even if numerals are not put to the second through fourth respective corresponding components, the second through forth respective corresponding components are also assumed to have similar components such as parts.

The oscillator unit 10 includes the detection unit 20 inside, and is coupled to and supported by the detection spring unit 60. The detection spring unit 60 is coupled to and supported by a drive beam 39. The drive beam 39 is configured in an integrated manner by being coupled to a movable part 35 of the drive unit 30, and configured in an integrated manner as a whole by also being coupled to a movable part 51 of the drive monitoring unit 50. Furthermore, the drive spring unit 40 is provided between the drive unit 30 and the drive monitoring unit 50. On the other hand, the detection unit 20 in the oscillator unit 10 is coupled to the terminal unit 70, and the terminal unit 70 is coupled to the arithmetic processing unit 90 via the interconnections 80. The whole of the compound sensor is configured to be surrounded by the frame 100. Here, the compound sensor of the present embodiment may be composed of various kinds of materials, and for example, may be configured as a microstructure of MEMS (Micro Electronic Mechanical System) by using a semiconductor substrate.

Next, descriptions are given about individual components.

Figure 2:
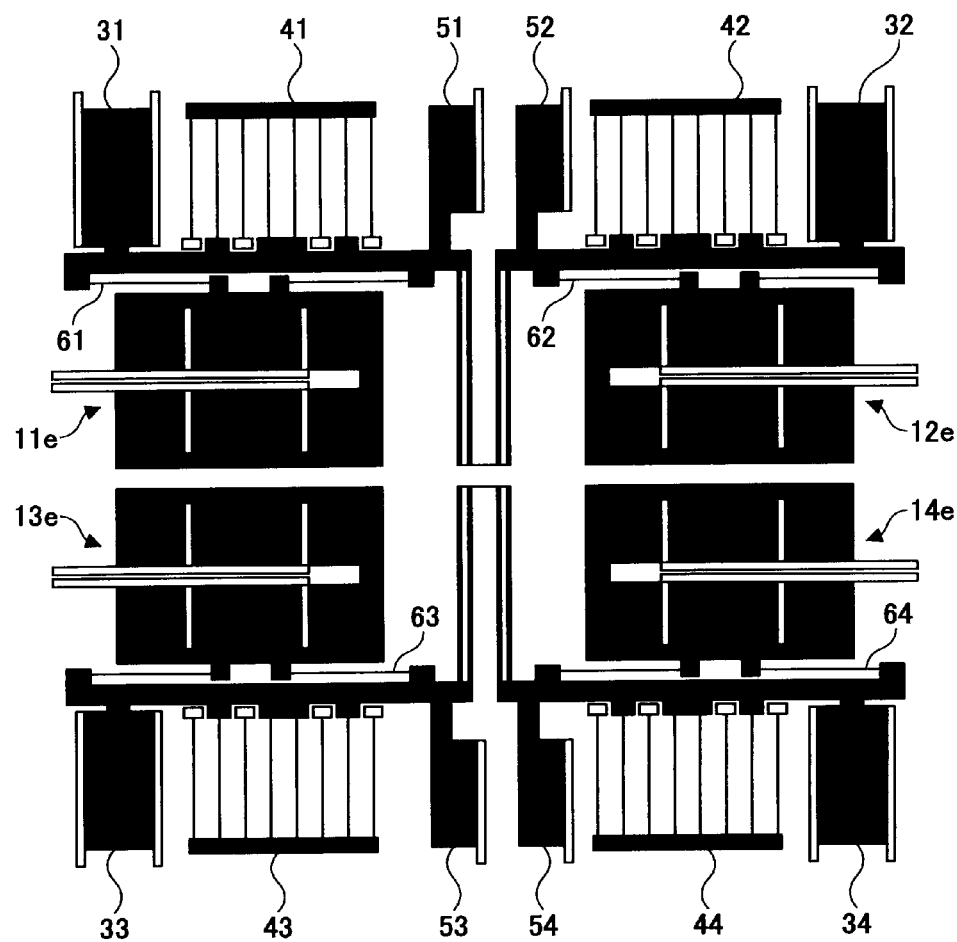
FIG. 2 is a view showing the compound sensor of the first embodiment more simplistically than that of FIG. 1.

The oscillator unit 10 is a mass body to detect a physical amount such as an angular rate, acceleration, angular acceleration, or centrifugal force. The first through fourth oscillators 11 to 14 are driven in a transverse direction and detect a longitudinal displacement. In this way, a driving direction and a displacement direction are different directions, and for example, are set in a direction perpendicular to each other as shown in FIG. 2. The oscillator unit 10 is configured to be able to be displaced in both of the driving direction and a detecting direction, and detects a predetermined physical amount by being driven in the driving direction and by being displaced in the detecting direction. The compound sensor of the first embodiment is, for example, mounted on a mobile object such as a vehicle and the like, and detects the angular rate, acceleration, angular acceleration and centrifugal force of the mobile object. In that case, a predetermined detecting direction is set, and the compound sensor detects a physical component in the detecting direction.

The oscillator unit 10 includes the detection unit 20 inside, and functions as the mass body as a whole, including the detecting unit 20. The oscillator unit 10 includes a movable part 17 and a fixed part 18. The movable part 17 is a part that can be displaced. On the other hand, the fixed part 18 is a part that is fixed to the frame 100. Therefore, the oscillator unit 10 is surrounded by the movable part 17 of an outer frame, and configured to be able to be displaced as a whole.

The oscillator unit 10 includes the first through fourth oscillators 11 to 14, and the respective oscillators 11 to 14 are symmetrically disposed to each other. A concrete operation of the oscillator unit 10 is described hereinafter. By providing four oscillators 11 to 14 and by appropriately setting a phase of the oscillators 11 to 14 in the driving direction, it is possible to separate an angular acceleration and the like generated by vibration of the compound sensor in itself when detecting an angular rate, and to individually detect each component of the angular rate, acceleration, angular acceleration and centrifugal force.

The detection unit 20 is a detecting means that detects a displacement of the oscillator unit 10 in the detecting direction. Here, the detecting direction is a longitudinal direction in FIG. 1. With regard to the detection unit 20, four of the first through fourth detection parts 21 to 24 are provided in the respective oscillators 11 to 14, corresponding to the first through fourth oscillators 11 to 14 respectively. Each of the detection parts 21 to 24 includes detection electrodes 25. The detection electrodes 25 include movable electrodes 27 coupled to the movable part 17 of the oscillators 11 to 14, and fixed electrodes 28 coupled to the fixed part 18. Plural of both of the movable electrodes 27 and the fixed electrodes 28 are provided, and opposing pairs of the movable electrodes 27 and the fixed electrodes 28 are disposed so as to face and overlap each other. If the movable electrodes 27 move in a direction where the movable electrodes 27 get away from the opposing fixed electrodes 28, capacitance of the detection electrodes 25 decreases. If the movable electrodes 27 move toward a direction where the movable electrodes 27 come close to the opposing fixed electrodes 28, the capacitance of the detection electrodes 25 increases. Then, by detecting a change of the capacitance, the displacement of the first through fourth oscillators 11 to 14 can be detected. Furthermore, forces applied to the first through fourth oscillators 11 to 14 can be obtained based on the detected displacement of the first through fourth oscillators 11 to 14.

In each of the detection parts 21 to 24, the detection electrodes 25 are provided in four blocks. The more a number of the detection electrodes 25 increases, the more an S/N (Signal/Noise) ratio improves, but the more an occupied space grows. Therefore, the number of the detection electrodes 25 may be set at an appropriate number based on a relationship between the S/N and the space.

In each of the detection parts 21 to 24, an arrangement relationship between the movable electrodes 27 and the fixed electrodes 28 is made constant. More specifically, in the first detection part 21, all of the movable electrodes 27 are disposed on the upper side (in the back) of the fixed electrodes 28. With this, if the first oscillator 11 is displaced toward either side of the detecting direction, in all pairs of the movable electrodes 27 and the fixed electrodes 28, the capacitance changes, either increasing or decreasing. Details in this regard are described hereinafter by using enlarged figures. This arrangement relationship is a configuration that can obtain a high S/N ratio in a small footprint. Here, with respect to the second detection part 22, all of the movable electrodes 27 are on the upper side (in the back) of the fixed electrodes 28 as well as the first detection part 21. In contrast, in the third detection part 23 and the fourth detection part 24, all of the fixed electrodes 28 are on the upper side (in the back) of the movable electrodes 27.

Combining such an electrode arrangement and the driving direction makes it possible to obtain the angular rate with a high degree of accuracy, but details in this regard are described hereinafter.

The drive unit 30 is a driving means to vibrate the oscillator unit 10 in the driving direction. The drive unit 30 may include four of the first through fourth drive parts 31 to 34 corresponding to the first through fourth oscillators 11 to 14, but as long as the drive unit 30 can drive the first through fourth oscillators 11 to 14 at a proper phase, the drive unit 30 may not be necessarily provided in four parts, but may be configured in an integrated manner. However, in the present embodiment, an example is described where the drive unit 30 is provided as first through fourth drive parts 31 to 34, corresponding to the first through fourth oscillators 11 to 14, respectively.

Each of the first through fourth drive parts 31 to 34 includes a movable part 35 and a fixed part 36. In addition, the movable part 35 is provided with movable electrodes 37, and the fixed part 36 is provided with fixed electrodes 38. The movable electrodes 37 on both sides of the movable part 35 and the fixed electrodes 38 of the fixed part 36 that sandwiches the movable part 35 from both sides are configured to face to each other and to overlap alternately in a longitudinal direction. The movable electrodes 37 and the fixed electrodes 38 are configured to oscillate the movable part 35 in a transverse direction due to attractive forces in the transverse direction generated by applying alternate current of an opposite phase to the right and left fixed electrodes 38. Since the movable part 35 is coupled to the above-mentioned drive beam 39, the oscillation transmitted to the drive beam 39 is transmitted to the oscillators 11 to 14 through the detection spring unit 60, and each of the oscillators 11 to 14 is driven to oscillate.

The drive spring unit 40 is a spring unit to help the drive unit 30 to drive the oscillator unit 10. The drive spring unit 40 extends in a direction perpendicular to the plane of paper in a plate manner, and forms a plate spring. Here, the plate spring may also include first through fourth drive springs 41 to 44, corresponding to the first through fourth oscillators 11 to 14 and the first through fourth drive parts 31 to 34.

The drive monitoring unit 50 is a means to monitor a displacement in the driving direction. In the compound sensor of the present embodiment, because a phase during drive affects the detection of physical amounts, a detecting operation is performed by monitoring the displacement in the driving direction.

The drive monitoring unit 50 may include first through fourth drive monitoring parts 51 to 54, corresponding to the first through fourth oscillators 11 to 14 and the first through fourth drive parts 31 to 34. Each of the first through fourth drive monitoring parts 51 to 54 includes a movable part 55, a fixed part 56, movable electrodes 57 coupled to the movable part 55 and fixed electrodes 58 coupled to the fixed part 56, and monitors a direction and an amount of a driving displacement based on the capacitance change.

The detection spring unit 60 is a spring unit to allow the oscillator unit 10 to be displaced in the detecting direction. Because the detection spring unit 60 is a plate spring that extends in a direction perpendicular to the plane of paper like a plate, the detection spring unit 60 has elasticity, and elastically supports the oscillator unit 10 in a state where the oscillator unit 10 can move in the detecting direction (longitudinal direction). Moreover, the detection spring unit 60 functions to transmit the oscillation generated in the drive unit 30 from the drive beam 39 to the oscillator unit 10.

The detection spring unit 60 also includes first through fourth detection springs 61 to 64, corresponding to the first through fourth oscillators 11 to 14.

The terminal unit 70 is an electrode unit to make an electrical connection with outside. Because electric power is provided for the compound sensor from the outside and a detected result is needed to be output outside, the terminal unit 70 is provided to make the connection with the outside.

Here, first through fourth detection terminals 71 to 74 are connected to the first through fourth detection parts 21 to 24, respectively and are configured to be able to output electric signals detected in the detection parts 21 to 24.

The arithmetic processing unit 90 is an arithmetic processing means to calculate the respective physical amounts of the angular rate, acceleration, angular acceleration and centrifugal force from the detection result detected in the respective first through fourth detection parts 21 to 24. An electrical circuit or a microcomputer including a CPU (Central Processing Unit) operated by reading a program may be available for the arithmetic processing unit 90 as long as predetermined arithmetic processing can be performed.

The arithmetic processing unit 90 is configured to be connected to the first through fourth detection terminals 71 to 74 by the interconnections 80 so that the detection results of the first through fourth detection parts 21 to 24 are input into the arithmetic processing unit 90.

Here, in FIG. 1, the arithmetic processing unit 90 is provided outside the frame 100, in other words, outside the compound sensor, but for example, may be provided on a substrate of the compound sensor. Also, for example, it is possible to provide an ECU (Electronic Control Unit) outside the compound sensor and to perform the arithmetic processing with the arithmetic processing unit 90 provided in the outside ECU. Furthermore, if there is space in the frame 100, providing the arithmetic processing unit 90 inside the frame 100 is also possible. Thus, the arithmetic processing unit 90 can be provided in various positions according to an intended purpose.

The frame 100 is an outer frame to be a supporting member of the compound sensor. For example, a thick-formed part of a semiconductor substrate and the like may be used.

Next, by using FIG. 2 through FIG. 4B, descriptions are given about an operation of the compound sensor. FIG. 2 is a view showing the compound sensor of the first embodiment more simplified than that in FIG. 1. Hereinafter, because of space limitations and ease of understanding, descriptions are given by using such simplified drawings. Moreover, in the compound sensor of FIG. 2, the first through fourth oscillators 11e to 14e have a larger shape than that of the first through fourth oscillators 11 to 14. This is because the number of detection electrodes inside the first through fourth oscillators 11 to 14 is more than that of the detection electrodes 25 (not shown, see FIG. 1) inside the first through fourth oscillators 11 to 14 of the compound sensor of FIG. 1. The compound sensor of FIG. 2 includes the detection electrodes 25 whose capacitance increases and decreases by displacement of the movable electrodes 27 (not shown, see FIG. 1) inside a single detection part, being different from the electrode arrangement of the compound sensor of the FIG. 1. Even if the compound sensor of FIG. 2 has such an electrode arrangement, as long as the compound sensor includes four of the first through fourth oscillators 11 to 14, the compound sensor can be configured as the compound sensor of the first embodiment. In other words, the compound sensor of the first embodiment can be configured without relation to the configuration of the detection unit 20 inside the first through fourth oscillators 11 to 14. Therefore, in the first embodiment, a description is given by representatively using the first through fourth oscillators 11 to 14, but the description should be treated as being applicable to a compound sensor including various kinds of the detection unit 20. Also, with respect to the other components, since the descriptions are given in FIG. 1, the descriptions are omitted here by putting the same numerals.

Figure 3A:
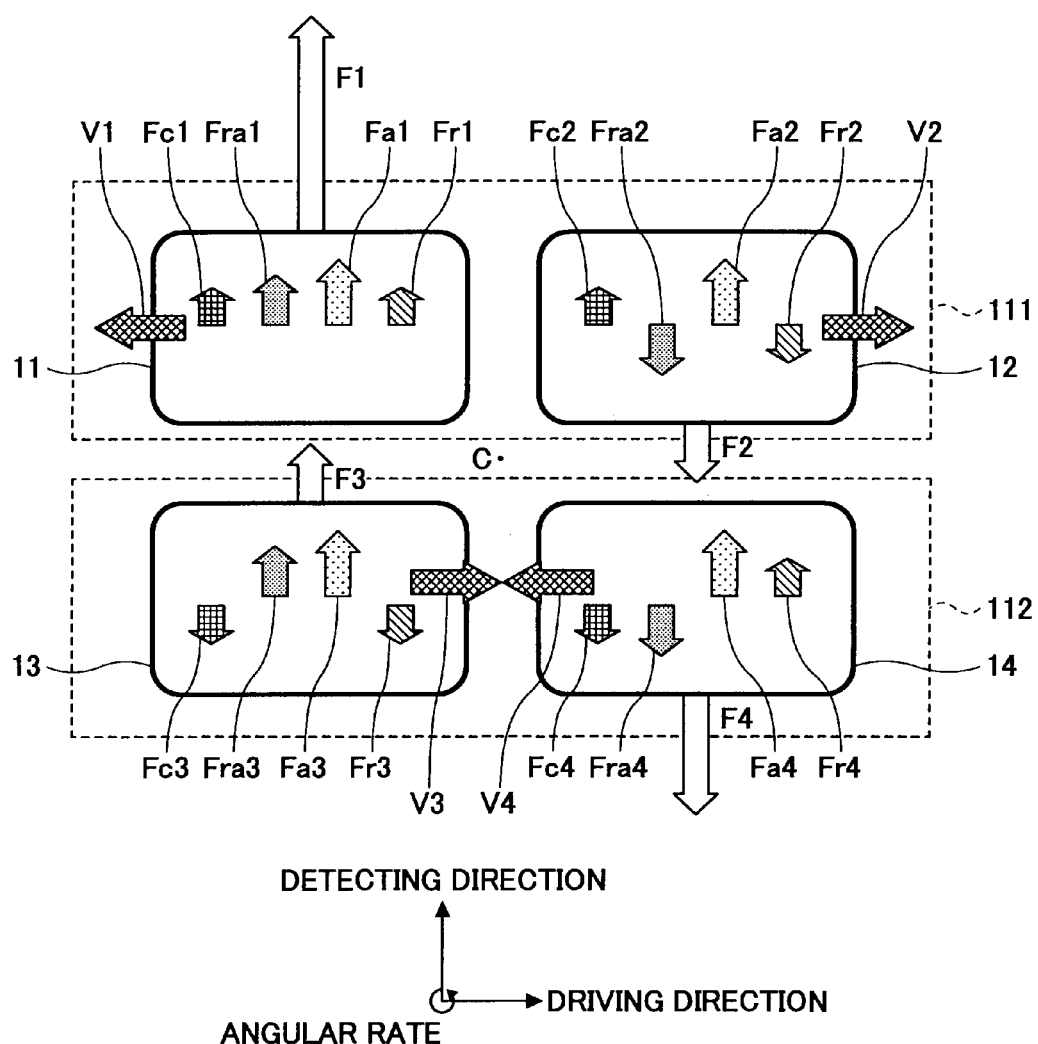
FIG. 3A is a view illustrating a driving method and a detecting method of the compound sensor of the first embodiment.

FIG. 3A is a view for illustrating a driving method and a detection method of the compound sensor of the first embodiment. In FIG. 3A, the first through fourth oscillators 11 to 14 are extracted and shown by being simplified. The first through fourth oscillators 11 to 14 are symmetrically disposed. Here, a combination of the first oscillator 11 and the second oscillator 12 is made a first unit 111, and a combination of the third oscillator 13 and the fourth oscillator 14 is made a second unit 112. In addition, a driving direction is made a transverse direction; the rightward direction is made a positive direction and the leftward direction is made a negative direction. Similarly, a detecting direction is made a longitudinal direction; the upward (backward) direction is made a positive direction and the downward (frontward) direction is made a negative direction. In the embodiment hereinafter, unless there is a specific notice, descriptions are given under a similar coordinate system.

Moreover, in the driving directions of the first through fourth oscillators 11 to 14, a driving direction by oscillation of the first oscillator 11 is made V1; an oscillatory driving direction of the second oscillator 12 is made V2; an oscillatory driving direction of the third oscillator 13 is made V3; and an oscillatory driving direction of the fourth oscillator 14 is made V4. Similarly, in a detecting direction of the first through fourth oscillators 11 to 14, a generative force acting on the first oscillator 11 is expressed as F1; a generative force acting on the second oscillator 12 is expressed as F2; a generative force acting on the third oscillator 12 is expressed as F3; and a generative force acting on the fourth oscillator 14 is expressed as F4.

In FIG. 3A, the first oscillator 11 included in the first unit 111 and the second oscillator 12 are driven to oscillate in opposite phase to each other. Specifically, when the first oscillator 11 moves leftward, the second oscillator 12 moves rightward, and the first oscillator 11 and the second oscillator 12 move in directions away from each other. Similarly, the third oscillator 13 and the fourth oscillator 14 included in the second unit 112 are driven to oscillate in opposite phase. Specifically, when the third oscillator 13 moves rightward, the fourth oscillator 14 moves leftward, and the third oscillator 13 and the fourth oscillator 14 move in directions approaching each other. Moreover, a phase between the first unit 111 and the second unit 112 is an opposite phase because when the first oscillator 11 and the second oscillator 12 in the first unit 111 move in the directions away from each other, the third oscillator 13 and the fourth oscillator 14 in the second unit 112 approach each other. As a result, the first oscillator 11 and the fourth oscillator 14 are in the same phase, and the second oscillator 12 and the third oscillator 13 are in the same phase.

In this way, in the compound sensor of the first embodiment, the oscillators 11, 12 in the first unit 111 are driven to oscillate in opposite phase to each other, and the oscillators 13, 14 in the second unit 112 are driven to oscillate in opposite phase, and also, the first unit 111 and the second unit 112 are driven to oscillate in opposite phase.

When the oscillators 11 to 14 are driven, it is assumed that the force F1 on the first oscillator 11, the force F2 on the second oscillator 12, the force F3 on the third oscillator 13 and the force F4 on the fourth oscillator 14 are generated. This time, if a Coriolis force due to the angular rate is made Fr; an inertial force due to the acceleration is made Fa; an inertial force due to the angular acceleration is made Fra; and an inertial force due to the centrifugal force is made Fc, components of the respective forces work toward directions shown in FIG. 3A, corresponding to the first through fourth oscillators 11 to 14 respectively. In other words, in FIG. 3A, the Coriolis force Fr acting on the first through fourth oscillators 11 to 14 due to the angular rate is shown as Fr1 to Fr4; the inertial force Fa due to the acceleration is shown as Fa1 to Fa4; the inertial force Fra due to the angular acceleration is shown as Fra1 to Fra4; and the centrifugal force Fc is shown as Fc1 to Fc4.

Here, if mass of a moving body is made m, and a motion (linear) speed is made V, the Coriolis force Fr due to the angular rate ω is given by exterior product between ω and V as Fr=2 mω×V. Therefore, the direction of Fr corresponds with a screw traveling direction where a right screw is rotated from V vector toward ω's rotating direction. Hence, as shown in FIG. 3A, the Coliolis forces Fr1 to Fr4 acting on the first through fourth oscillators 11 to 14 have directions determined by exterior products between motion directions V1 to V4 of the driven first through fourth oscillators 11 to 14 and forces F1 to F4 acting on the respective oscillators 11 to 14. Specifically, the Coriolis force Fr1 is toward the positive direction in the detecting direction; the Coriolis force Fr2 is toward the negative direction in the detecting direction; the Coriolis force Fr3 is toward the negative direction in the detecting direction; and the Coriolis force Fr4 is toward the positive direction in the detecting direction.

In addition, regarding the generated force Fa due to the acceleration, since forces toward the same direction apply to the all of the first through fourth oscillators 11 to 14, the generated forces Fa1 to Fa4 acting on the first through fourth oscillators 11 to 14 due to the acceleration have the same direction of the positive detecting direction.

Moreover, because the generated force Fra due to the angular acceleration is a torque that is applied without relation to a motion direction of the first through fourth oscillators 11 to 14, all of the forces Fra1 to Fra4 have the same direction as resultant forces F1 to F4 acting on the respective oscillators 11 to 14. Specifically, the inertial force Fra1 is toward the positive direction in the detecting direction; the inertial force Fra2 is toward the negative direction in the detecting direction; the inertial force Fra3 is toward the positive direction in the detecting direction; and the inertial force Fra4 is toward the negative direction in the detecting direction.

Similarly, because the centrifugal force Fc is a force consistently acting from the center C outward without relation to the driving direction of the respective oscillators 11 to 14, such as Fc1 to Fc4 shown in FIG. 3A, the centrifugal forces Fc1 to Fc4 have directions from the center of the first through fourth oscillators 11 to 14 outward. Specifically, the forces from the center C outward act on the first oscillator 11 of the left upper side in a direction from the center C upward to the left, on the second oscillator 12 of the right upper side in a direction from the center C upward to the right, on the third oscillator 13 of the left lower side in a direction from the center C downward to the left and on the fourth oscillator 14 of the right lower side in a direction from the center C downward to the right. Therefore, with respect to the components in the detecting direction, the centrifugal force Fc1 is positive; the centrifugal force Fc2 is positive; the centrifugal force Fc3 is negative; and the centrifugal force Fc4 is negative.

FIG. 3B is a table showing a calculating method of resultant forces of the generated force Fr due to the angular rate, the generated force Fa due to the acceleration, the generated force Fra due to the angular acceleration and the generated force Fc due to the centrifugal force from the resultant force F1 to F4 acting on the respective oscillators 11 to 14 shown in FIG. 3A.

As shown in FIG. 3B, the generated force Fr due to the acceleration is obtained by adding up F1 through F4 in a direction shown in FIG. 3A, as shown by formula (1).

[First Formula]

$$Fr=(F1+F4)-(F2+F3) \quad (1)$$

In a similar way, the generated force Fa due to the acceleration is obtained by using formula (2), by adding up the force F1 through F4 in a direction shown in FIG. 3A.

[Second Formula]

$$Fa=(F1+F2)+(F3+F4) \quad (2)$$

In a similar way, the generated force Fra due to the angular acceleration is obtained by formula (3).

[Third Formula]

$$Fra=(F1+F3)-(F2+F4) \quad (3)$$

Also, the generated force Fc due to the centrifugal force is obtained by formula (4).

[Fourth Formula]

$$Fc=(F1+F2)-(F3+F4) \quad (4)$$

In this way, according to the compound sensor of the first embodiment, in the forces F1 to F4 that act on the first through fourth oscillators 11 to 14, it is possible to cancel and remove unnecessary forces from the forces of the detection object. Moreover, it is possible to separately detect all of the generated force Fr due to the angular rate, the generated force Fa due to the acceleration, the generated force Fra due to the angular acceleration and the generated force Fc due to the centrifugal force, which makes high-accuracy detection possible. Here, because it is the displacement convertible into the force that detection unit 20 detects, the arithmetic processing to cancel and remove such unnecessary forces is performed based on the displacement.

FIG. 4A is a view showing an example of a configuration of a conventional angular rate/acceleration sensor. The conventional angular rate/acceleration sensor includes four drive parts 231 to 234, four drive springs 241 to 244, four drive monitoring parts 251 to 254 and four detection springs 261 to 264 respectively, but with respect to oscillators, includes only two oscillators of a first oscillator 211 and a second oscillator 212. In this configuration, a physical amount is detected in a state where the first oscillator 211 and the second oscillator 212 are driven to oscillate in an opposite-phase driving direction V1, V2. As shown in FIG. 4A, if a force F1 is detected from the first oscillator 211 and a force F2 is detected from the second oscillator 212, a Coriolis force Fr1 acting on the first oscillator 211 due to an angular rate and an inertial force Fra2 due to angular acceleration are both in a positive detecting direction. Also, a Coriolis force Fr2 acting on the second oscillator 212 due to the angular rate and an inertial force Fra2 due to the angular acceleration are both in a negative detecting direction. Therefore, a resultant force of the angular rate Fra becomes Fr=F1+F2, but this includes a component of the angular acceleration. In the end, with respect to the Coriolis force Fra due to the angular rate, only Fr+Fra=F1+F2, which includes an inertial force component due to the angular acceleration, can be calculated. Therefore, if the compound sensor rotates in itself and the angular acceleration is added to the compound sensor other than motion of a vehicle of the detecting object, an accurate angular rate cannot be detected by separating the angular acceleration. That means that the conventional angular and rate/acceleration sensor cannot detect the angular rate individually by separating the angular acceleration from the angular rate, unlike the compound sensor of the present embodiment. Moreover, the conventional acceleration/angular rate sensor cannot also detect the centrifugal force.

However, even in the conventional angular rate/acceleration sensor, the inertial force Fa due to the acceleration can be obtained, which comes from Fa=F1−F2, without including the other components.

FIG. 4B is a view showing the compound sensor of the first embodiment in a format similar to FIG. 4A. Since respective components are similar to those in FIG. 1, the same numerals are put to the components similar to those in FIG. 1, and the descriptions are omitted. Also, drive forces are similar to those in FIG. 3A, in that a drive force direction V1 that drives a first oscillator 11 and a drive force direction V2 that drives a second oscillator 12 are in opposite phase; a drive force direction V3 that drives a third oscillator 13 and a drive force direction V4 that drives a fourth oscillator 14 are in opposite phase; and the first and second oscillators 11, 12 and the third and fourth oscillators 13, 14 are driven in opposite phase to each other. Moreover, it is assumed that forces F1 to F4 act on respective oscillators 11 to 14.

In FIG. 4B, components Fr1 to Fr4 of a Coriolis force Fr due to an angular rate in respective oscillators 11 to 14 and components Fra1 to Fra4 of an inertial force Fra due to angular acceleration in the respective oscillators 11 to 14 are different in direction to each other with respect to the third oscillator 13 and the fourth oscillator 14. Furthermore, even if all of the other combinations are referred to, there are no force components that are in the same direction among all of the first oscillators 11 to the fourth oscillators 14. Accordingly, it is found that all of the Coriolis force Fr due to the angular rate, the inertial force Fa due to the acceleration, the inertial force Fra due to the angular acceleration and the centrifugal force Fc can be obtained individually. In fact, each force, as described in FIG. 3A and FIG. 3B, is obtained as shown in formula (1) to (4). Since duplicate formulas do not exist, all of the components can be detected individually by separating one component from the other components.

Here, the forces acting on the first through fourth oscillators 11 to 14 or the displacements proportional to the forces may be detected by the detection part 20, and the arithmetical processing described in FIG. 3A through FIG. 4B may be performed by the arithmetical processing unit 90.

Moreover, detection of the displacement that the detection unit 20 performs is described by citing the example of detection of the variable capacitance by the comb-like electrodes in the first through fourth detection parts 21 to 24 in FIG. 1. However, in addition to the example, using other method is possible, such as a method of using a piezoelectric device or an optical displacement detecting method.

Thus, according to the compound sensor of the first embodiment, with respect to four physical amounts of the angular rate, acceleration, angular acceleration and centrifugal force, each component can be separated and detected individually, which makes it possible to enhance detection accuracy to a great extent.

Figure 5:
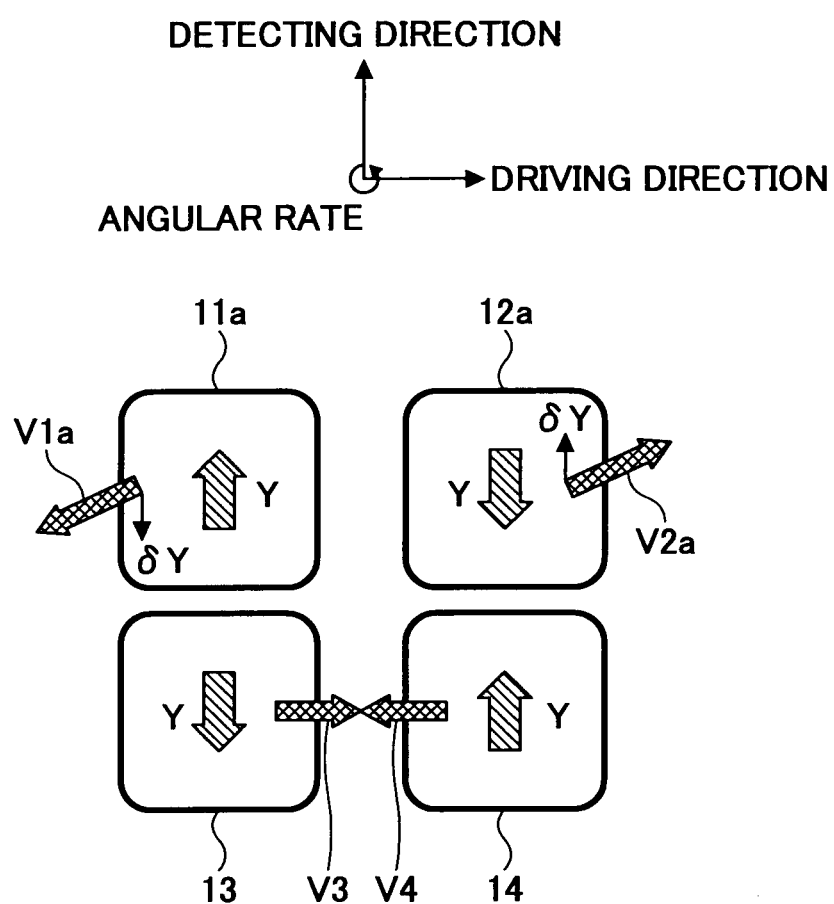
FIG. 5 is a view illustrating a behavior of the compound sensor of the first embodiment if a diagonal vibration caused by dispersion in up and down directions occurs.
Figure 6:
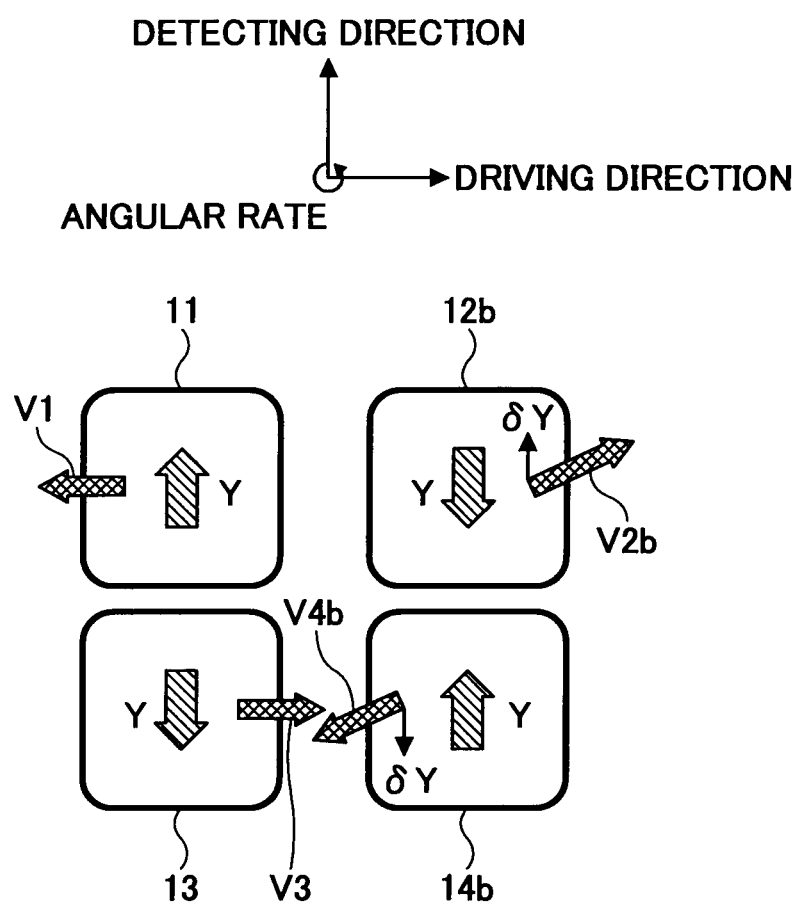
FIG. 6 is a view illustrating a behavior of the compound sensor of the first embodiment if a diagonal vibration caused by dispersion in right and left directions occurs.

Next, by using FIG. 5 and FIG. 6, descriptions are given about other functions of the compound sensor of the first embodiment. Specifically, the compound sensor of the first embodiment can improve robustness against production dispersion.

FIG. 5 is a view for illustrating operation of the compound sensor of the first embodiment when diagonal oscillation occurs due to vertical dispersion in the first through fourth oscillators 11 to 14. As shown in FIG. 5, a case is discussed where the first oscillator 11a and the second oscillator 12a oscillate diagonally, not in a lateral direction, by including some components of vertical detection direction. In FIG. 5, a diagonal oscillation drive force that drives the first oscillator 11a is made V1a, by which a negative micro displacement (−δY) is assumed to occur in a detecting direction of the first detection part 21. Also, a diagonal oscillation drive force that drives the second oscillator 12a is made V2a, by which a positive micro displacement δY is assumed to occur in a detecting direction of the first detection part 21. Furthermore, a displacement due to the Coriolis force is made Y.

In this case, the displacements Y due to the Coriolis force and the micro displacements δY due to the diagonal oscillation cancel each other because of their reverse actions, and the displacements of the first oscillator 11a and the second oscillator 12a decrease. Specifically, if the displacement of the first oscillator 11a is made Y1; the displacement of the second oscillator 12a is made Y2; the displacement of the third oscillator 13a is made Y3; and the displacement of the fourth oscillator 14a is made Y4, Y1 through Y4 is expressed as follows.

$$Y1 = Y - \delta Y$$

$$Y2 = (-Y + \delta Y)$$

$$Y3 = (-Y)$$

$$Y4 = Y$$

Next, if F is replaced by Y, and calculation to extract the angular rate component of formula (1) is executed, $$(Y1+Y4)-(Y2+Y3)=(2Y-\delta Y)-(-2Y+\delta Y)=4Y$$

is obtained. That means that the displacements (δY) due to the production dispersion in the vertical direction (detecting direction) cancel each other, and only the angular rate components can be extracted.

Here, even if the dispersion occurs only in the third oscillator 13 and the fourth oscillator 14 of the lower side, or the vertical dispersion occurs in both of between the first oscillator 11 and the second oscillator 12 of the upper side and between the third oscillator 13 and the fourth oscillator 14 of the lower side, the micro displacements δY can be canceled according to a similar way of thinking.

FIG. 6 is a view for illustrating an operation if a diagonal oscillation occurs due to right and left dispersion in the first through fourth oscillators 11 to 14 of the compound sensor of the first embodiment. As shown in FIG. 6, a case is investigated where a second oscillator 12b and a fourth oscillator 14b diagonally oscillate, not in a lateral direction, by including some components of vertical detection direction. In FIG. 6, a state is shown where a micro displacement δY occurs in a positive direction in a detecting direction due to diagonal oscillatory drive V2b of the second oscillator 12b, and a micro displacement (−δY) occurs in a negative direction in the detecting direction due to diagonal oscillatory drive V4b of the fourth oscillator 14b.

In this case, a displacement due to a Coriolis force is made Y, and displacements of the first, second, third and fourth oscillators 11b, 12b, 13b, 14b are respectively made Y1, Y2, Y3, Y4, the displacements of the respective oscillators 11b, 12b, 13b, 14b become as follows.

$$Y1 = Y$$

$$Y2 = (-Y + \delta Y)$$

$$Y3 = (-Y)$$

$$Y4 = Y - \delta Y$$

If these formulas are substituted into the formula (1) that extracts an angular rate component by replacing F with Y, $$(Y1+Y4)-(Y2+Y3)=2Y-\delta Y-(-2Y+\delta Y)=4Y$$

is obtained. That means that the displacements (δY) due to production dispersion in right and left direction (driving direction) cancel each other, and extracting only the angular rate component is possible.

Here, even if the dispersion occurs on the left side, or similar dispersion occurs on the both of the right and left sides, the micro displacement (δY) is canceled based on the similar way of thinking.

Thus, according to the compound sensor of the first embodiment, even if the vertical dispersion or horizontal dispersion in chips caused by production is generated, influence against the detection of the angular rate can be removed. This makes it possible to improve the robustness against the production dispersion.

[Second Embodiment]

Figure 7:
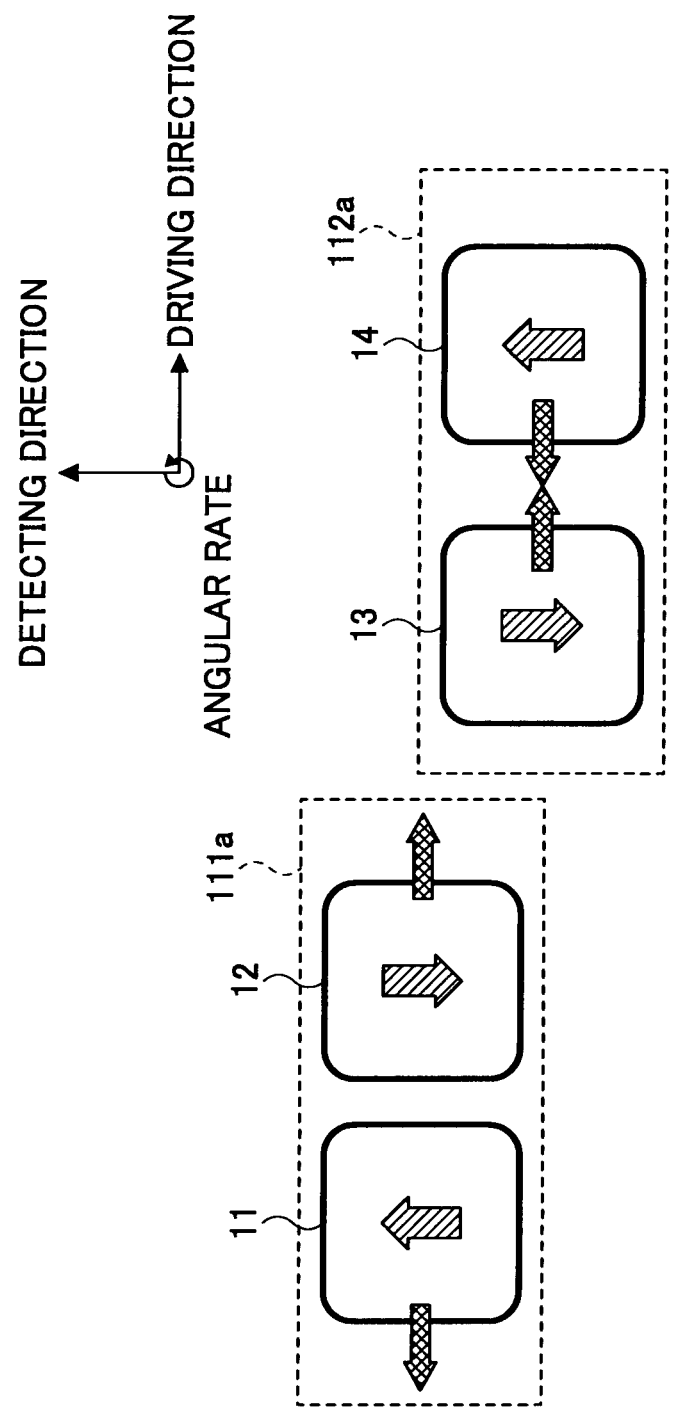
FIG. 7 is a view showing an example of a configuration of a compound sensor of a second embodiment of the present invention.

FIG. 7 is a view showing an example of a compound sensor configuration of a second embodiment of the present invention. In FIG. 7, only a first oscillator 11, a second oscillator 12, a third oscillator 13 and a fourth oscillator 14 are extracted and shown. Here, same numerals are put to components similar to the compound sensor of the first embodiment. Also, in the second embodiment, as described in FIG. 2, an arrangement structure of the detection unit 20 inside the first through fourth oscillators 11 to 14 does not matter. For example, a configuration such as the first through fourth oscillators 11e to 14e in FIG. 2 is possible. Furthermore, this view can be applied to a third embodiment through a seventh embodiment in a similar way.

The compound sensor of the second embodiment is similar to the compound sensor of the first embodiment in that the first oscillator 11 and the second oscillator 12 are symmetrically and oppositely disposed to constitute a first unit 111a, and the third oscillator 13 and the forth oscillator 14 are symmetrically and oppositely disposed to constitute a second unit 112a. However, the compound sensor of the second embodiment is different from the compound sensor of the first embodiment in that the first unit 111a and the second unit 112a are not closely disposed to each other.

Thus, respective units 111a, 112a may not be closely disposed to each other, or may not be disposed to form lines vertically and horizontally. Even the compound sensor of such a configuration can calculate the four different components separately as long as the first oscillator 11 and second oscillator 12 in the first unit 111a, and the third oscillator 13 and fourth oscillator 14 in the second unit 112a, are symmetrically disposed to each other, and driven to oscillate in opposite phase to each other, and further the first unit 111a and the second unit 112a are driven in opposite phase to each other. That means that the angular rate, acceleration, angular acceleration and centrifugal force can be detected with a high degree of accuracy.

Here, if components such as the detection unit 20, drive unit 30 and the like are configured to have a disposition caused by being moved corresponding to the disposition of the first through fourth oscillators 11 to 14, the compound sensor of the second embodiment can be operated as well as that of the first embodiment.

According to the compound sensor of the second embodiment, while the first unit 111a and the second unit 112a are arranged in various ways corresponding to an intended purpose, the angular rate, acceleration, angular acceleration and centrifugal force can be detected with a high degree of accuracy, and the compound sensor can be flexibly used for various intended purposes.

[Third Embodiment]

Figure 8:
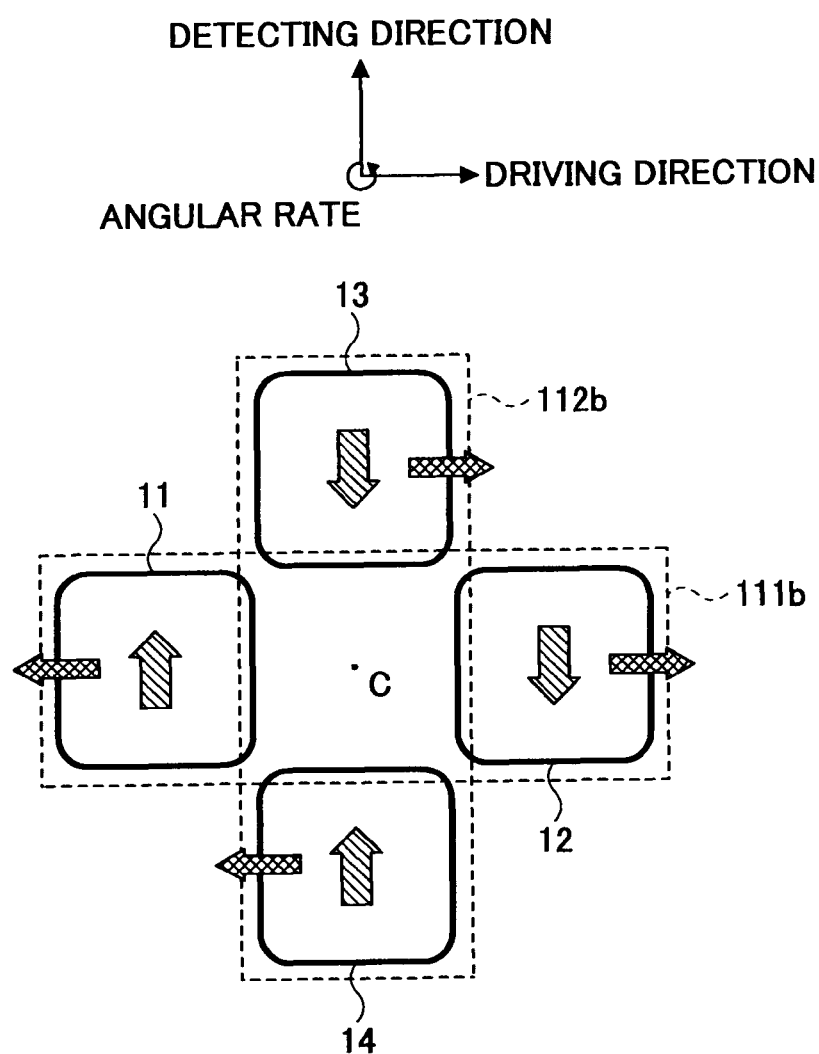
FIG. 8 is a view showing an example of a configuration of a compound sensor of a third embodiment of the present invention.

FIG. 8 is a view showing an example of the compound sensor of the third embodiment of the present invention. The compound sensor of the third embodiment is configured to arrange first through fourth oscillators 11 to 14 in a cross direction of point symmetry. Here, since the first through fourth oscillators 11 to 14 in themselves may be configured to be similar to the first through fourth oscillators 11 to 14 of the first embodiment, the same numerals are put to components corresponding to those of the first embodiment. Moreover, components in the first through fourth oscillators 11 to 14 are omitted in FIG. 8.

In FIG. 8, in the compound sensor of the third embodiment, the first oscillator 11 and the second oscillator 12 are disposed oppositely and symmetrically in a transverse direction (line symmetrically and point symmetrically) at a short distance. In addition, the third oscillator 13 and the fourth oscillator 14 are disposed oppositely and symmetrically in a longitudinal direction also at a short distance. As a whole, the compound sensor has a point-symmetrical and crisscross arrangement with respect to a center C.

The first and second oscillators 11, 12 are driven to oscillate in opposite phase to each other in a driving direction. Also, the third and fourth oscillators 13, 14 are not disposed in the same straight line with respect to driving directions, but the driving directions are in the same axial direction and common in the transverse direction. Then, the third and fourth oscillators 13, 14 are also driven to oscillate in opposite phase to each other. Furthermore, the first unit 111b including the first and second oscillators 11, 12 and the second unit including the third and fourth oscillators 13, 14 are also driven to oscillate in opposite phase.

Therefore, in such a point-symmetric and crisscross disposition as a whole, each physical amount of the angular rate, acceleration, angular acceleration and centrifugal force can be separately and individually detected by utilizing the formulas (1) to (4) described in the first embodiment.

Here, with respect to the detection unit 20, as well as the first embodiment, first through fourth detection parts 21 to 24 can be disposed inside the first through fourth oscillators 11 to 14, and a drive unit 30 can be also provided in a position appropriate to drive the first through fourth oscillators 11 to 14.

In this way, according to the compound sensor of the third embodiment, by arranging the first through fourth oscillators 11 to 14 in a cross shape of point symmetry as a whole, and by arranging the first unit 111b and the second unit 112b at right angles, it is possible to configure the whole in a shape similar to a square shape or a diamond-like shape, and to respond to the demands of such shapes.

[Fourth Embodiment]

Figure 9:
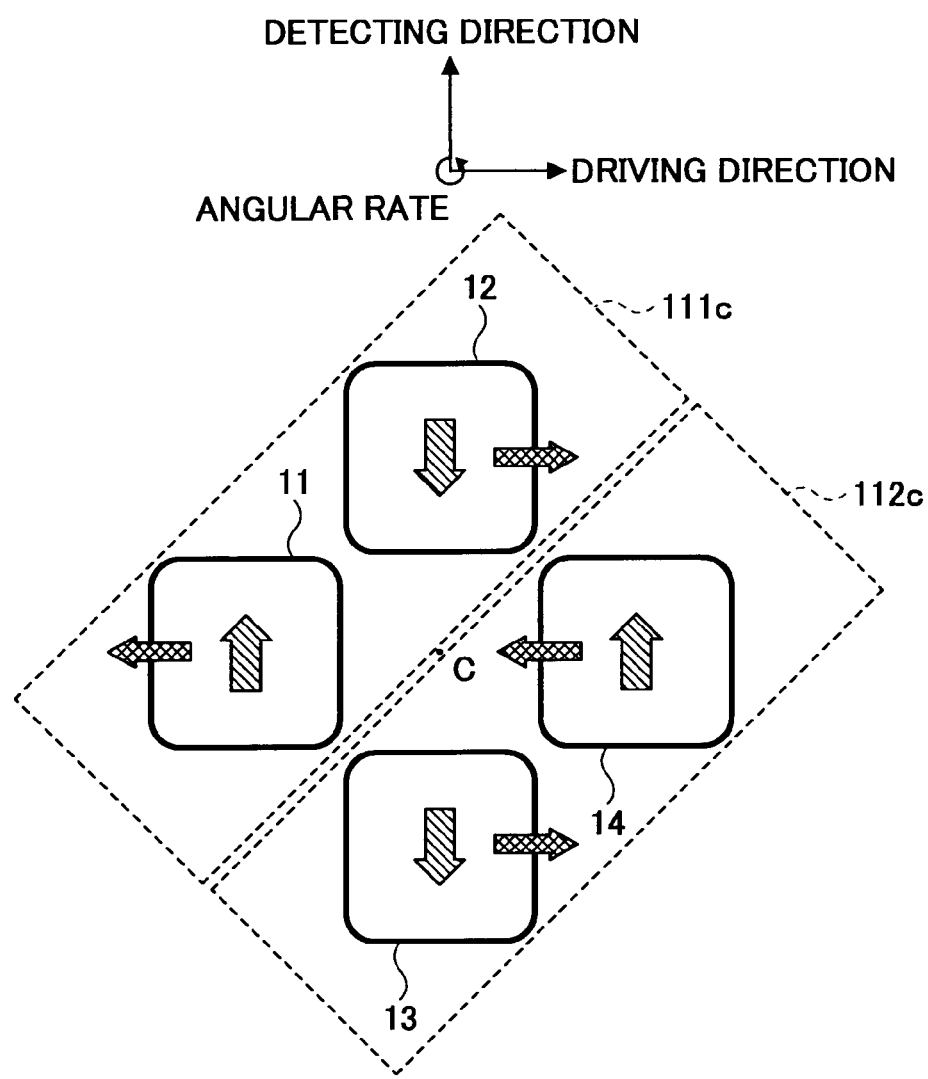
FIG. 9 is a view showing an example of a configuration of a compound sensor of a fourth embodiment of the present invention.

FIG. 9 is a view showing an example of a configuration of a compound sensor of the fourth embodiment of the present invention. The compound sensor of the fourth embodiment resembles the compound sensor of the third embodiment as a whole, and has a plane composition where the first through fourth oscillators 11 to 14 are point-symmetrically disposed with respect to a center C. However, the compound sensor of the fourth embodiment differs from the compound sensor of the third embodiment in that the first oscillator 11 and the second oscillator 12 that are a combination driven in an opposite phase are disposed at an angle to each other, and similarly, the third oscillator 13 and the fourth oscillator 14 that are driven in opposite phase are disposed at an angle to each other.

Thus, as long as driving directions between the first and second oscillators 11, 12, and between the third and fourth oscillators 13, 14 are in the same axial direction and parallel, the first and second oscillators 11, 12 and the third and fourth oscillators 13, 14 may be disposed diagonally to each other. In this case, the first oscillator 11 and the second oscillator 12 have a point-symmetric relationship, and also can be said to be oppositely disposed at an angle. Because the driving direction is common in a transverse direction, and the first oscillator 11 and the second oscillator 12 are driven in opposite phase, conditions of being symmetrically disposed and driven to oscillate in opposite phase are met. In addition, between the first unit 111c and the second unit 112c, because the third and fourth oscillators 13, 14 come close while the first and second oscillators 11, 12 in the first unit 111c get away, the condition where different units are in opposite phase to each other is also met. Hence, by formulas (1) to (4) of the first embodiment, the angular rate, acceleration, angular acceleration and centrifugal force can be separately and individually detected.

In this manner, according to the compound sensor of the third embodiment, by using the oscillators 11 to 14 disposed at an angle in respective units 111c, 112c, the angular rate, acceleration, angular acceleration and centrifugal force can be separately and individually detected, and even if only such a disposition is acceptable, high-accuracy detection of physical amounts can be performed.

Here, in the compound sensor of the first through fourth embodiments, the first through fourth oscillators 11 to 14, 11a to 14, and 11 to 14b are all disposed in the same substrate surface. Thus, the first through fourth oscillators 11 to 14, 11a to 14, and 11 to 14b can adopt various arrangement structures in the same substrate surface according to an intended purpose.

[Fifth Embodiment]

FIG. 10A is a perspective view showing a configuration example of a compound sensor of a fifth embodiment of the present invention. FIG. 10B is a view showing an example of a cross-sectional configuration of the compound sensor of the fifth embodiment. The compound sensor of the fifth embodiment is configured to sterically dispose first through fourth oscillators 11c to 14c on a supporting substrate 120.

In FIG. 10A and FIG. 10B, the first oscillator 11c and the second oscillator 12c are symmetrically and oppositely disposed on the supporting substrate 120, and further the third oscillator 13c and the fourth oscillator 14c are symmetrically and oppositely disposed thereon.

The first oscillator 11c and the second oscillator 12c constitute a first unit 111d, and the third oscillator 13c and the fourth oscillator 14c constitute a second unit 112d. In other words, the first and second oscillators 11c, 12c included in the first unit 111d, and the third and fourth oscillators 13c, 14c included in the second unit 112d are respectively in the same substrate planes, but the first unit 111d and the second unit 112d are not in the same substrate plane and are configured so that the second unit 112d is above the first unit 111d.

In this way, as long as the oscillators 11 to 14 in the same unit are in the same substrate plane, the units may not be necessarily in the same substrate plane.

Because a basic opposite-phase pair of the first and second oscillators 11, 12, and the pair of the third and fourth oscillators 13, 14 detect a Coriolis force on a plane by cooperating with each other, the first and second oscillators 11, 12 and the third and fourth oscillators 13, 14 need to detect a rotational displacement in a plane in pairs. However, because values used by a combination of the unit 111d, 112d are values used for arithmetic processing after detection, exactitude up to a level that is required in direct physical measurement is not required.

Here, in the compound sensor of the fifth embodiment, with respect to the detection unit 20, the first through fourth detection parts 21 to 24 can be respectively disposed inside the first through fourth oscillators 11c to 14c, and the drive unit 30 can be provided at an appropriate position in the supporting substrate 120.

Thus, as long as the oscillators 11c to 14c in the same unit 111d, 112d are in the same plane, the unit 111d, 112d can be sterically configured to have various arrangement structures.

[Sixth Embodiment]

Figure 11:
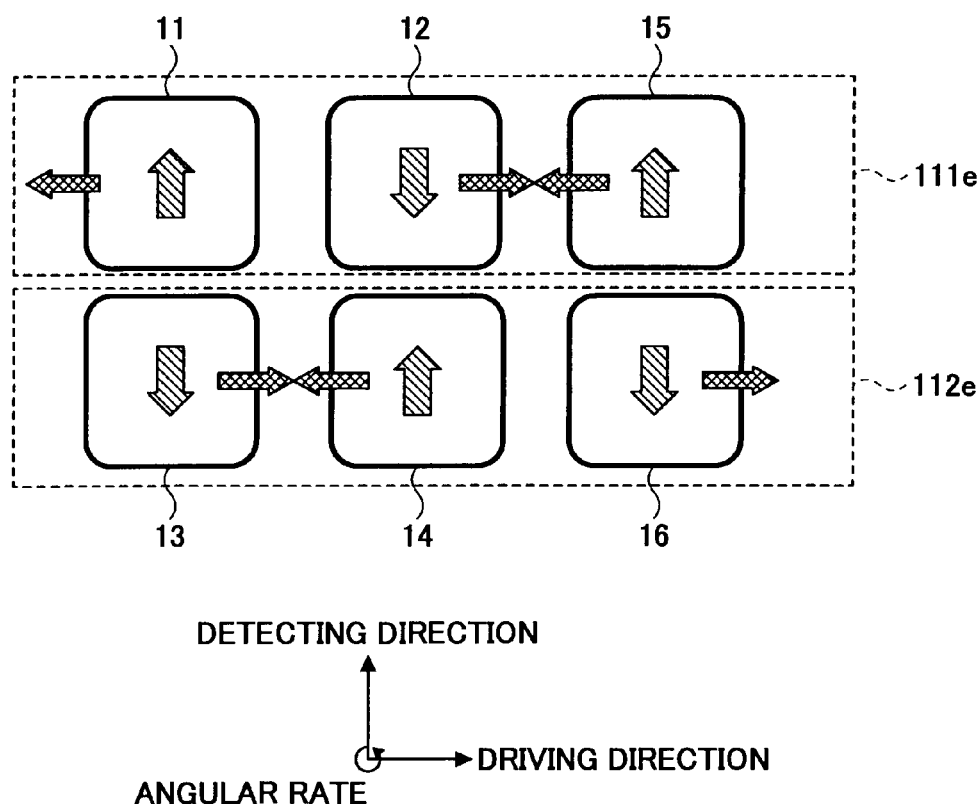
FIG. 11 is a view showing an example of a configuration of a compound sensor of a sixth embodiment of the present invention.

FIG. 11 is a view showing an example of a plane composition of a compound sensor of a sixth embodiment of the present invention. The compound sensor of the sixth embodiment further includes a fifth oscillator 15 and a sixth oscillator 16 in addition to first through fourth oscillators 11 to 14. Then, the first, second and fifth oscillators 11, 12, 15 constitute a first unit 111e, and the third, fourth and sixth oscillators 13, 14, 16 constitute a second unit 112e.

In this manner, more than four of the oscillators 11 to 16 may be provided. In this case, added oscillators 15, 16 should be added evenly in number to the first unit 111e and the second unit 112e. In FIG. 11, one oscillator, the fifth oscillator 15 is added to the first unit 111e, and one oscillator, the sixth oscillator 16 is added to the second unit 112e. By adding a same number of oscillators 15, 16 to both units 111e, 112e, the compound sensor can be configured without complicated arithmetic processing to obtain respective component forces such as an angular rate and the like.

Moreover, the added oscillators 15, 16 are disposed to maintain a symmetrical relationship between the adjacent existing oscillators 11 to 14 in the same units 111e, 112e. This makes it possible to increase detection values from the symmetrically arranged oscillator unit 10, maintaining the same relationship, and to enhance force detection accuracy.

Furthermore, in adding the oscillators 15, 16, if there is a fewer-oscillator phase among two phases within the same units 111e, 112e, a drive unit 30 drives the added oscillators 15, 16 in the fewer-oscillator phase. More specifically, if the oscillators are an even number within the same units 111e, 112e including the added oscillators 15, 16, the added oscillators 15, 16 are driven so that the opposite-phase oscillators 10 are the same number within the same units 111e, 112e. In addition, if the two phases of the existing oscillators 11 to 14 are the same number within the same units 111e, 112e, the drive unit 30 drives the added oscillators 15, 16 so that the added oscillators 15, 16 are opposite in phase to the oscillators 12, 14 disposed nearest to the oscillators 15, 16 in a driving direction. This makes it possible to keep favorable a driving balance including a phase balance of the oscillators 10 within the respective units 111e, 112e, and to let the units 111e, 112e function as an oscillation-type acceleration sensor that detects the Coriolis force by oscillation in opposite phase as a whole. Then, it is possible to increase the number of the detection values useful for obtaining respective components of the generative forces Fr, Fa, Fra, Fc and to further enhance the detection accuracy.

Here in FIG. 11, with respect to the first unit 111e, since the first oscillator 11 and the second oscillator 12 are driven in opposite phase, and the two phases are the same number of oscillators 10, the added fifth oscillator 15 is driven so as to be opposite in phase to the second oscillator 12 disposed nearest to the fifth oscillator 15. Similarly, with respect to the second unit 112e, since the existing oscillators 13, 14 are driven in opposite phase, the added sixth oscillator 16 is driven opposite in phase to the fourth oscillator 14 disposed nearest to the sixth oscillator 16.

Moreover, in FIG. 11, the description is given by citing an example where the oscillators 15, 16 are respectively added to the first unit 111e and the second unit 112e, but adding more oscillators is possible. For example, in FIG. 11, if more oscillators 10 are added to the first unit 111e and the second unit 112e, because the first and fifth oscillators 11, 15 are in the same phase in a negative driving direction, and the second oscillator 12 is in opposite phase in a positive driving direction, in order to balance, the added oscillator 10 is driven in the same phase to the second oscillator 12. This point is similar with respect to the second unit 112e, and if the oscillator 10 is further added to a state of FIG. 11, the oscillator 10 is driven in the same phase to the fourth oscillator 14.

In this way, by adding the same number of oscillators 10 to the first unit 111e and the second unit 112e, considering the phase balance, and by maintaining an even number of oscillators 10 as a whole, the detection accuracy within the units 111e, 112e can be improved, and the angular rate, acceleration, angular acceleration and centrifugal force can be detected with a greater degree of accuracy.

[Seventh Embodiment]

Figure 12:
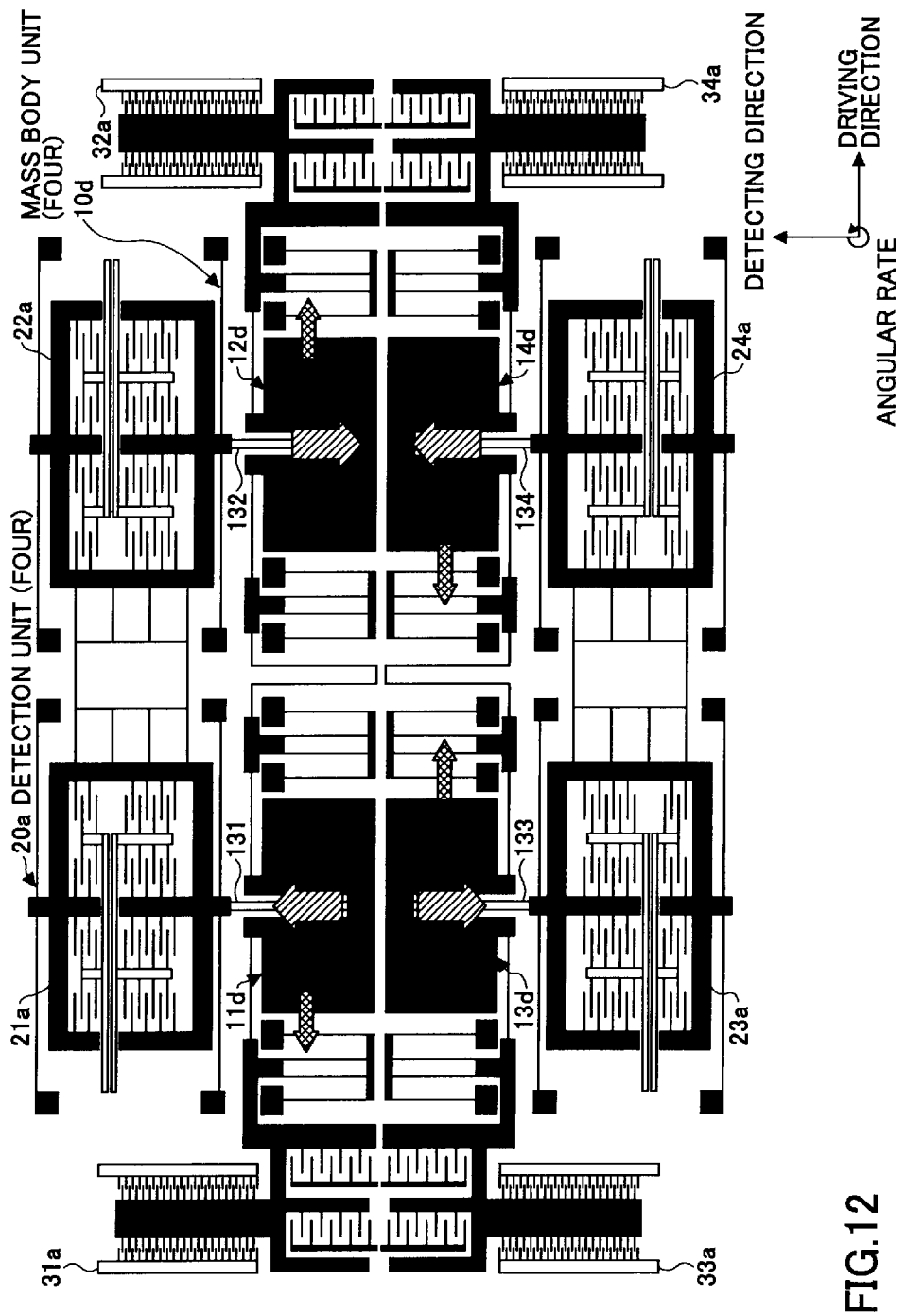
FIG. 12 is a view showing an example of a whole configuration of a compound sensor of a seventh embodiment of the present invention.

FIG. 12 is a view showing an example of a whole configuration of a compound sensor of a seventh embodiment of the present invention. The compound sensor of the seventh embodiment includes first through fourth oscillators 11d to 14d, first through fourth detection parts 21a to 24a, first through fourth drive parts 31a to 34a and first through fourth connection springs 131 to 134. The compound sensor of the seventh embodiment differs from the compound sensor of the first through sixth embodiments in that the first through fourth detection parts 21a to 24a are provided not inside the first through fourth oscillators but outside.

In the compound sensor of the seventh embodiment, the first through fourth detection parts 21a to 24a are provided outside the first through fourth oscillators 11d to 14d. Then, the first through fourth oscillators 11d to 14d are connected to the first through fourth detection parts 21a to 24a by the first through fourth connection springs 131 to 134. With this configuration, displacements of the first through fourth oscillators 11a to 14a in the detecting direction are detected by the first through fourth detection parts 21a to 24a via the first through fourth connection springs 131 to 134.

In the compound sensor of such a configuration, by providing the first through fourth oscillators 11d to 14d symmetrically, angular rate, acceleration, angular acceleration and centrifugal force can be detected separately and individually. More specifically, as shown in FIG. 12, the first drive part 31a and the second drive part 32a drive the first oscillator 11d and the second oscillator 12d that constitute a first unit in opposite phase, and the third drive part 33a and the fourth drive part 34a drive the third oscillator 13d and the fourth oscillator 14d that constitute a second unit in opposite phase, and the first unit and the second unit are driven in opposite phase, by which it is possible to perform arithmetic processing as well as the first embodiment, and to detect the angular rate, acceleration, angular acceleration and centrifugal force separately and individually.

In this manner, according to the compound sensor of the seventh embodiment, even if the detection units 20a and the oscillators 10d are provided separately, the angular rate, acceleration, angular acceleration and centrifugal force can be detected separately and individually.

Here, in a sensor structure of arranging more than four displacement detection parts, mass body parts and drive parts, the drive parts in a same driving direction may be rigidly and mechanically connected. This makes it possible to reduce displacement dispersion due to product dispersion while driving, and to provide a compound sensor with a higher degree of accuracy.

[Eighth Embodiment]

In a compound sensor of an eighth embodiment of the present invention, a description is given about an inner structure of a detection unit 20. The compound sensor of the eighth embodiment may have a same structure as the compound sensor of FIG. 1 described in the first embodiment with respect to a whole structure. In the first through seventh embodiments, descriptions are given about operations of the first through fourth oscillators 11 to 14, 11a, 12a, 12b, 14b, 11c to 14c, 11d to 14d, and 11e to 14e. In the embodiments after the eighth embodiment, detailed descriptions are given about the configuration and operation of the detection unit 20.

Figure 13A:
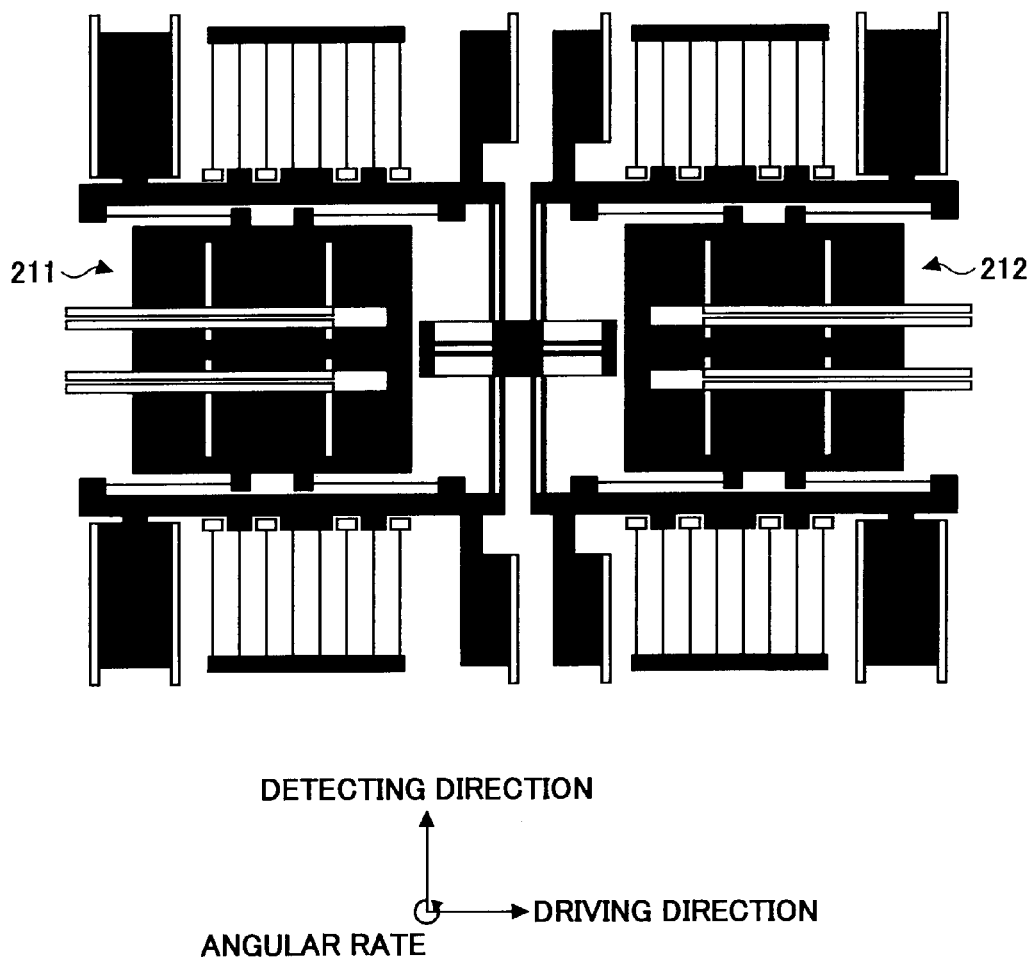
FIG. 13A is a view showing a whole configuration of a compound sensor of an angular rate/acceleration sensor including two conventional oscillators as a reference example for comparison.

FIG. 13A is a view showing a whole configuration of the conventional angular rate/acceleration sensor including two oscillators 211, 212 described in FIG. 4A as the comparative reference.

FIG. 13B is a view showing a whole configuration of a compound sensor in a case where a number of oscillators is increased as it is from the conventional angular rate/acceleration sensor shown in FIG. 13A. As shown in FIG. 13B, if two oscillators 211, 212 are simply added to make four oscillators 11e to 14e, it is found that width grows as much as the width of the added oscillators 13e, 14e, and a whole chip size grows. As described in the first through seventh embodiments, by the configuration of FIG. 13B, though the angular rate, acceleration, angular acceleration and centrifugal force can be detected separately and independently, because the chip size of the compound sensor grows, a problem of growing the chip size could occur if a small compound sensor is desired.

Figure 14A:
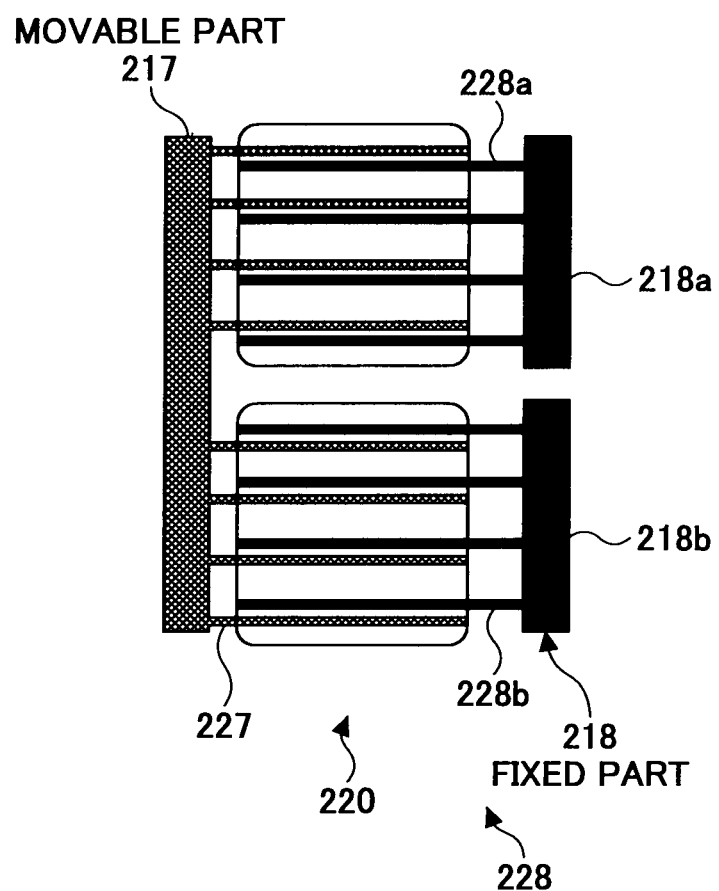
FIG. 14A is a view showing a part of a configuration of a detection part of a conventional angular rate/acceleration sensor of FIG. 13A.

FIG. 14A is an enlarged view showing a part of an inside structure of the detection unit 220 of the conventional angular rate/acceleration sensor of FIG. 13A. As shown in FIG. 14A, movable electrodes 227 supported by a movable part 217 and fixed electrodes 228 supported by a fixed part 218 include comb-like electrodes arranged facing each other at a predetermined distance. In addition, the fixed part 218 is divided into an upper fixed part 218a and a lower fixed part 218b, but the movable part 217 is configured to be a straight single body. Here, if attention is paid to an arrangement relationship between the facing movable electrodes 227 and fixed electrodes 228, the fixed electrodes 228a supported by the upper fixed part 218a are configured to be arranged under the movable electrodes 227, and the fixed electrodes 228b supported by the lower fixed part 218b are configured to be arranged above the movable electrodes 227. In other words, both of the fixed electrodes 228a and fixed electrodes 228b are configured to be arranged inside the corresponding movable electrodes 227. Here, FIG. 14A shows a balanced state where change in variable capacity is zero.

Figure 14B:
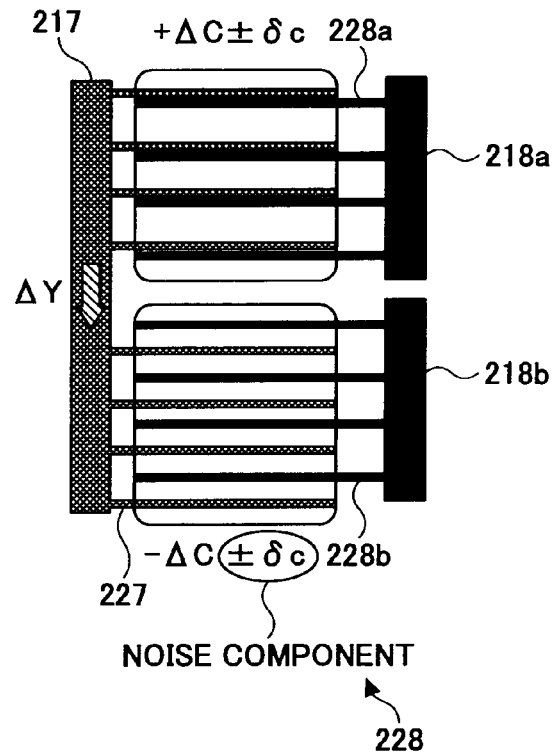
FIG. 14B is a view showing a state where a movable part is displaced from an equilibrium state of FIG. 14A.

FIG. 14B is a view showing a state where the movable part 217 is displaced $\Delta Y$ downward from the balanced state shown in FIG. 14. In this case, the distance between the upper fixed electrodes 228a and the movable electrodes 227 narrows, and the capacitance increases. On the other hand, the distance between the lower fixed electrodes 228b and the movable electrodes 217 grows, and the capacitance decreases. Here, if the capacitance change is made $\Delta C$, the upper fixed electrodes 228a and the movable electrodes 227 become $(-\Delta C \pm \delta c)$, and noise components $(\pm \delta C)$ occur on both. Because such noise components $(\pm \delta C)$ individually occur on both of a capacitance increase side and a capacitance decrease side, calculation becomes very difficult if the noise components are considered. Moreover, when the capacitance change is calculated, since the capacitance increase and the capacitance decrease are respectively calculated, and further the capacitances of those are obtained, the arithmetic processing becomes complicated in itself. In particular, as described in the first through seventh embodiments, if the oscillators 10 are four, a whole calculation becomes complicated as the oscillators 10 increase.

As a reference, if a dielectric constant is made ∈; a thickness of the electrode is made T; a distance between the electrodes is made d; a length of the electrode is made L; and a number of electrodes is made N, a relational expression between a displacement ΔY of the movable part 217 and the capacitance change ΔC becomes as formula (5).

[Fifth Formula]

$$\Delta C = \frac{\varepsilon TLN}{d^2} \Delta Y \quad (5)$$

Figure 14C:
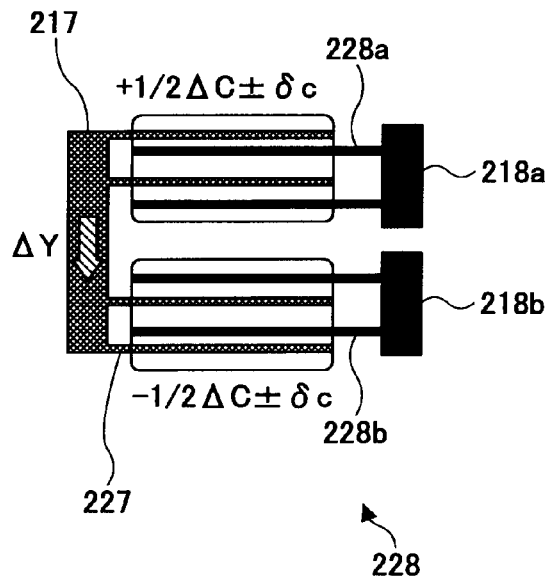
FIG. 14C is a view illustrating a phenomenon that occurs if a number of electrodes of the detection part is decreased.

FIG. 14C is a view illustrating a phenomenon where a number of electrodes of the detection unit 220 is decreased so that space growth described in FIG. 13B does not occur. As shown in FIG. 14C, if the number of the electrodes 228 is decreased, ΔC of signal component becomes a half, which means ½ ΔC, the noise itself remains (±δC), and the noise component grows compared to the signal component, which causes a problem of S/N decrease.

Therefore, the compound sensor of the eighth embodiment is configured to realize space-saving and not to decrease S/N, by considering the points in the detection unit 20 described in FIG. 13A through FIG. 14C.

Figure 15:
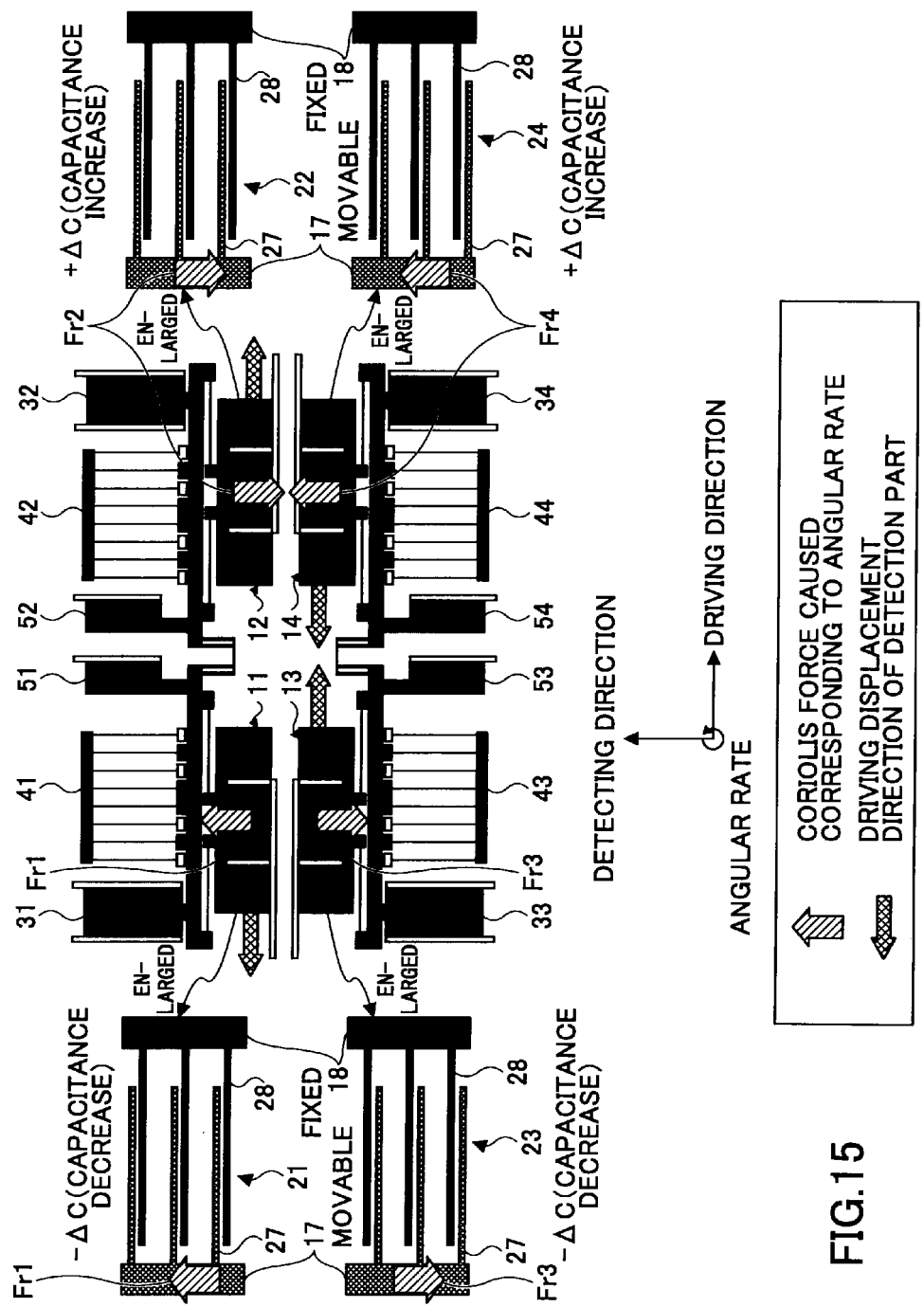
FIG. 15 is an enlarged configuration view of a portion of detection parts of a compound sensor of an eighth embodiment of the present invention.

FIG. 15 is a view showing a whole configuration of the compound sensor of the eighth embodiment and a part of configuration of the detection unit 20 by enlarging. In FIG. 15, since the whole configuration of the eighth embodiment is similar to the configuration shown in FIG. 1, and FIG. 15 is a simplified drawing of FIG. 1, same numerals are put to components similar to FIG. 1, and the description is omitted.

In FIG. 15, around the whole configuration drawing, enlarged configuration illustrations of a part of the first through fourth detection parts 21 to 24 are shown. To begin with, in the compound sensor of the eighth embodiment, a fixed part 18 is not divided within a single oscillator 11 to 14 in the detecting direction, but only a single fixed part 18 is provided. With this, the fixed parts 18 and the movable parts 17 correspond one-to-one, and therefore the fixed electrodes 28 and the movable electrodes 27 correspond one-to-one. This shows that the capacitance of all of the movable electrodes 27 and fixed electrodes 28 change to either increase or decrease if the movable part 17 is displaced either upward or downward.

Moreover, in FIG. 15, the first detection part 21 is configured to have the movable electrodes 27 on the upside (positive side) of the fixed electrodes 28 in the detecting direction, and the second detection part 22 has a similar arrangement. On the other hand, the third detection part 23 is configured to have the fixed electrodes 28 on the upside (positive side) of the movable electrodes 27 in the detecting direction, and the fourth detection part 24 has a similar arrangement. In other words, a pair of the first detection part 21 and second detection part 22 and a pair of the third detection part 31 and fourth detection part 24 have the same electrode arrangement as each other, and the first and second detection parts 21, 22 and the third and fourth detection part 23, 24 have different electrode structures from each other.

Then, as well as the description in the first embodiment, the drive unit 30 drives the first oscillator 11 and second oscillator 12 in opposite phase, and the third oscillator 13 and fourth oscillator 14 in opposite phase. On this occasion, if the first oscillator 11 and second oscillator 12 are made a first unit 111, and the third oscillator 13 and fourth oscillator 14 are made a second unit 112, the first unit 111 and second unit 112 are driven in opposite phase.

Here, in consideration of the Coriolis force generated by an angular rate, as described in the first embodiment, an upward force on the movable part 17 of the first oscillator 11, a downward force on the movable part 17 of the second oscillator 12, a downward force on the movable part 17 of the third oscillator 13 and an upward force on the movable part 17 of the fourth oscillator 14 respectively act. Therefore, as shown in FIG. 15, the capacitance decreases in the first detection part 21 because the movable electrodes 27 move in a direction away from the fixed electrodes 28, and the capacitance increases in the second detection part 22 because the movable electrodes 27 move in a direction closer to the fixed electrodes 28. Similarly, the capacitance increases in the third detection part 23 because the movable electrodes 27 get away from the fixed electrodes 28, and the capacitance increases in the fourth detection part 24 because the movable electrodes 27 get closer to the fixed electrodes 28.

Here, if capacitance variations of the first through fourth oscillators 11 to 14 are made C1 to C4; capacitance decrement is expressed (−ΔC); and capacitance increment is expressed (+ΔC), the total capacitance variation is expressed as follows.

(C1+C3)−(C2+C4)=(−2ΔC)−(2ΔC)=−4ΔC

More specifically, the total capacitance variation of the compound sensor when the Coriolis force is applied becomes (−4ΔC), which is the same as one in the conventional case where two oscillators 211, 212 exist as shown in FIG. 13A, and it is possible to calculate a capacitance variation corresponding to an angular rate and to detect the angular rate without complicating the calculation. This is because capacitance change of a same sign is generated in a pair of the first and third oscillators 21, 23 on the left side in the driving direction and in a pair of the second and fourth oscillators 22, 24, by pairing the first and second detection parts 21, 22 corresponding to the first and second oscillators 11, 12 that are driven in opposite phase and to which reverse Coriolis force is applied, by pairing the third and fourth detection parts 23, 24 similarly as pairs of the same electrode arrangement, and by making different electrode arrangements between the respective pairs.

Moreover, in a single oscillator 10, since all pairs of the movable electrodes 17 and the fixed electrodes 18 only contribute to either an increase or a decrease in capacitance, the increase and decrease in capacitance do not cancel each other. This makes it possible to maintain a necessary signal amount even if the number of electrodes is less than that of the conventional detection part 220, and to realize a high S/N equivalent to the conventional detection part 220.

Here, because the first through fourth detection parts 21 to 24 of the detection unit 20 shown in FIG. 1 have an arrangement relationship similar to the arrangement of the movable electrodes 27 and fixed electrodes 28 described in FIG. 15, the contents described in FIG. 15 can be directly applied to the compound sensor of the FIG. 1.

According to the compound sensor of the eighth embodiment, it is possible to detect various physical amounts, realizing space-saving, and to provide a small and high-accuracy compound sensor.

[Ninth Embodiment]

Figure 16:
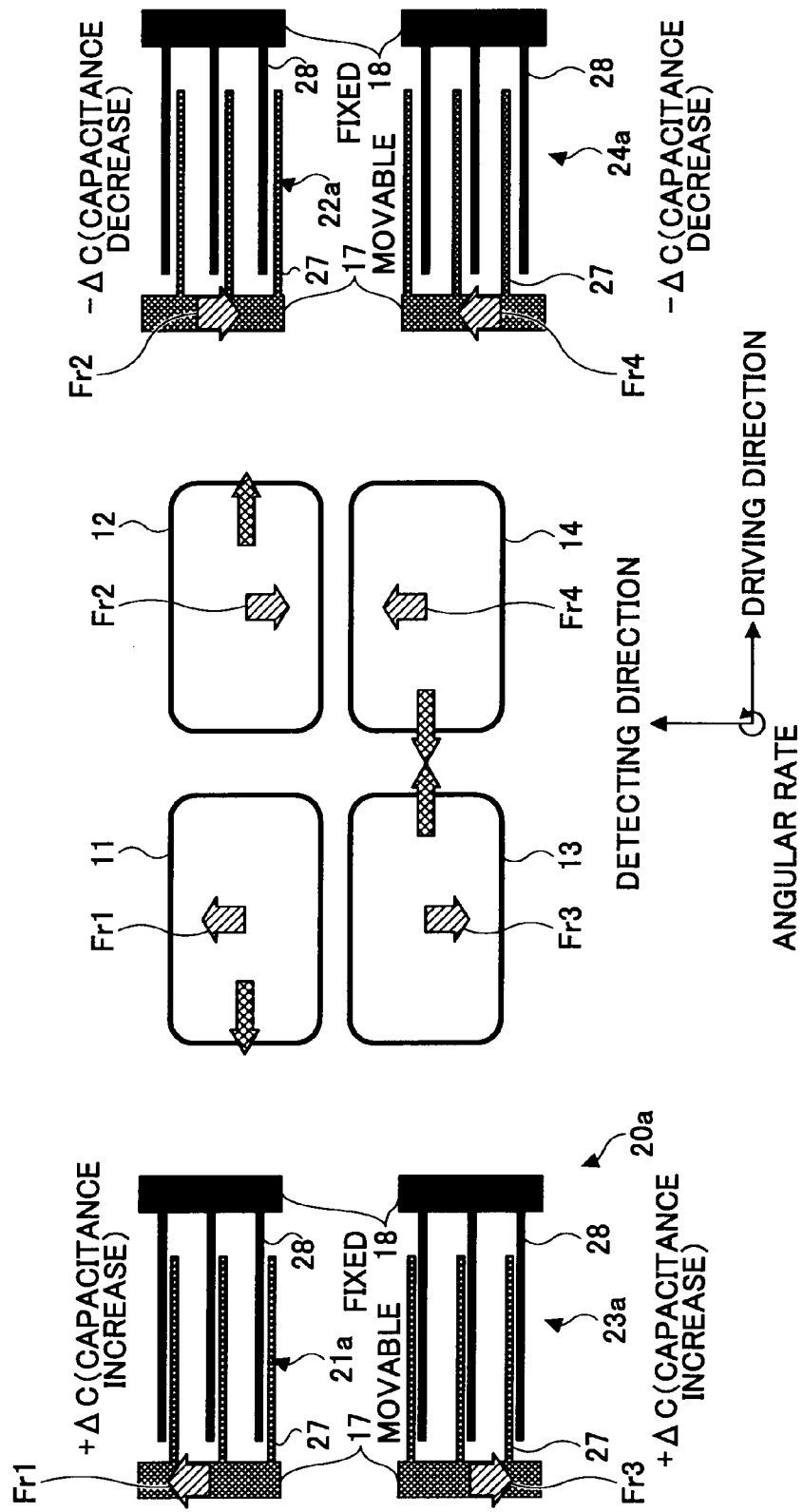
FIG. 16 is an enlarged configuration view of a portion of detection parts of a compound sensor of a ninth embodiment of the present invention.

FIG. 16 is a view showing a whole configuration of a compound sensor of a ninth embodiment and a configuration of a part of a detection unit by enlarging. In FIG. 16, first through fourth oscillators 11 to 14 of the compound sensor of the ninth embodiment are simplistically shown, and configurations of a part of the first through fourth detection parts 21a to 24a are shown by enlarging.

In the compound sensor of the ninth embodiment, a detection part 21a inside the first oscillator 11 includes fixed electrodes 28 above movable electrodes 27 in a detecting direction, and a detection part 22a inside the second oscillator 12 is also configured to have the fixed electrodes 28 above the movable electrodes 27. This is an upside-down configuration of the case of the eighth embodiment. On the other hand, a third detection part 23a inside the third oscillator 13 has an arrangement relationship where the movable electrodes 27 are above the fixed electrodes 28 in the detecting direction, and a fourth detection part 24a inside the fourth oscillator 14 also has an arrangement relationship where the movable electrodes 27 are above the fixed electrodes 28. This is also an upside-down configuration of the case of the eighth embodiment. More specifically, the first detection part 21a and the second detection part 22a constitute a pair having an arrangement relationship opposite to that of the eighth embodiment, and the third detection part 23a and the fourth detection part 24a also constitute a pair having an arrangement relationship opposite to that of the eighth embodiment.

In this case as well, an example is investigated where a drive unit 20 drives the first through fourth oscillators 11 to 14 in the same phase as the first embodiment, and an angular rate is detected. A Coriolis force due to the angular rate faces a direction similar to the first embodiment because a driving direction by the drive unit 20 is similar to the first embodiment, as shown in FIG. 16, upward in the detecting direction in a first movable part 17, downward in the second movable part 17, downward in the third movable part 17 and upward in the fourth movable part 17. Therefore, corresponding to these moving directions, the capacitance increases in the first detection part 21a, decreases in the second detection part 22a, increases in the third detection part 23a and decreases in the fourth detection part 24a.

Here, if the capacitance changes of the first through fourth detection parts 21a to 24a are made C1 to C4, and if the capacitance increment is made $\Delta C$ and the capacitance decrement is made $(-\Delta C)$, the total capacitance change when the angular rate is detected is expressed as follows.

$$(C1+C3)-(C2+C4)=2\Delta C-(-2\Delta C)=4\Delta C$$

Though the sign is different, the total capacitance change is obtained as well as the eighth embodiment.

According to the compound sensor of the ninth embodiment, while the arrangement relationship between the fixed electrodes 28 and the movable electrodes 27 is different from that of the first embodiment, the angular rate, acceleration, angular acceleration and centrifugal force can be obtained, balancing space-saving and high S/N.

[Tenth Embodiment]

Figure 17:
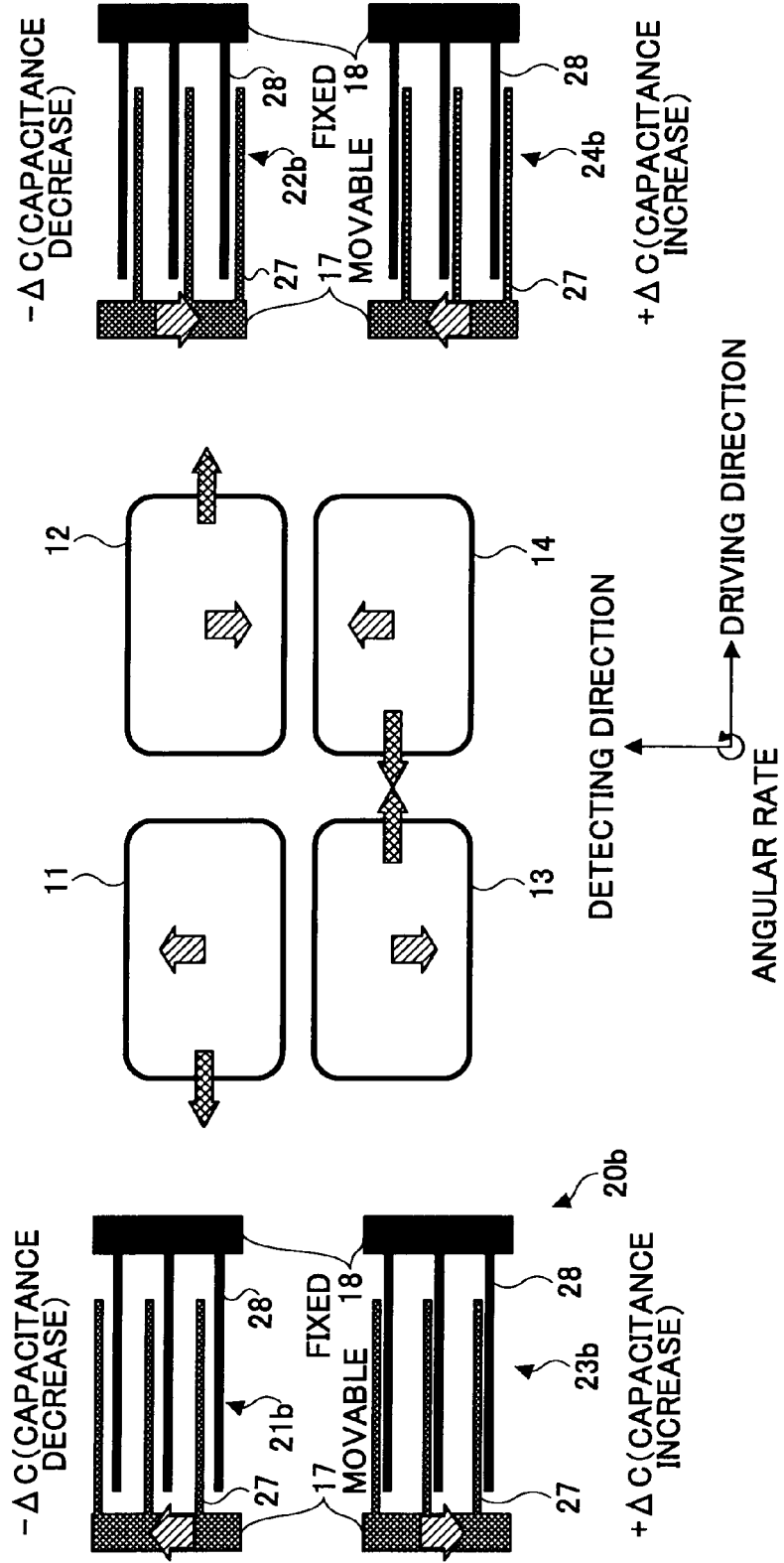
FIG. 17 is an enlarged configuration view of a portion of detection parts of a compound sensor of a tenth embodiment of the present invention.

FIG. 17 is a view showing a whole configuration of a compound sensor of a tenth embodiment and a configuration of a part of a detection unit by enlarging. In FIG. 17, an outline configuration of first through fourth oscillators 11 to 14 of the compound sensor of the tenth embodiment are shown as well as the ninth embodiment. In addition, a driving direction by the drive unit 20 is set as well as the ninth embodiment.

In the compound sensor of the tenth embodiment, a first detection part 21b and a third detection part 23b are configured to have an arrangement structure where movable electrodes 27 are above fixed electrodes 28, and have the same arrangement structure. On the other hand, a second detection part 22b and a fourth detection part 24b have the same electrode arrangement structure, where the fixed electrodes 28 are above the movable electrodes 27. Then, a pair of the first and third detection parts 21b, 23b and a pair of the second and fourth detection parts have different electrode arrangement structures. In this way, making one pair from the first detection part 21b and third detection part 23b, and making the other pair from the second detection part 22b and fourth detection part 24b are possible.

The first oscillator 11 and the third oscillator 13 face opposite in a driving direction and are driven in opposite phase. Therefore, because the Coriolis forces due to the angular rate face opposite, the first detection part 21b and the third detection part 23b are similar to a state described in the eighth embodiment in that different capacitance changes can be detected by the same electrode arrangement structure. Similarly, because the second oscillator 12 and the fourth oscillator 14 are driven in opposite phase, and the Coriolis forces face opposite, different capacitance changes can be detected by the same electrode arrangement structure. In this case, the first detection part 21b and the second detection part 23b decrease in capacitance, and the third detection part 23b and the fourth detection part 24b increase in capacitance.

In this case, if the capacitance changes of the first through fourth detection parts 21b to 24b are expressed as C1 to C4, and the increments and decrements in capacitance are expressed as $\Delta C$ and $(-\Delta C)$, the total capacitance change becomes as follows.

$$(C1+C2)-(C3+C4)=(-2\Delta C)-(2\Delta C)=(-4\Delta C)$$

Thus, as well as the eighth embodiment and the ninth embodiment, the angular rate can be easily calculated.

In this way, as long as oscillators with the same electrode arrangement can be paired with each other among the oscillators 11 to 14 driven in opposite phase, and the pairs are configured to have different electrode arrangement each other, the driving unit and the pair are not necessarily identical.

According to the compound sensor of the tenth embodiment, while the pair arrangement is different from the driving unit, the space-saving and high S/N can be compatible.

[Eleventh Embodiment]

Figure 18:
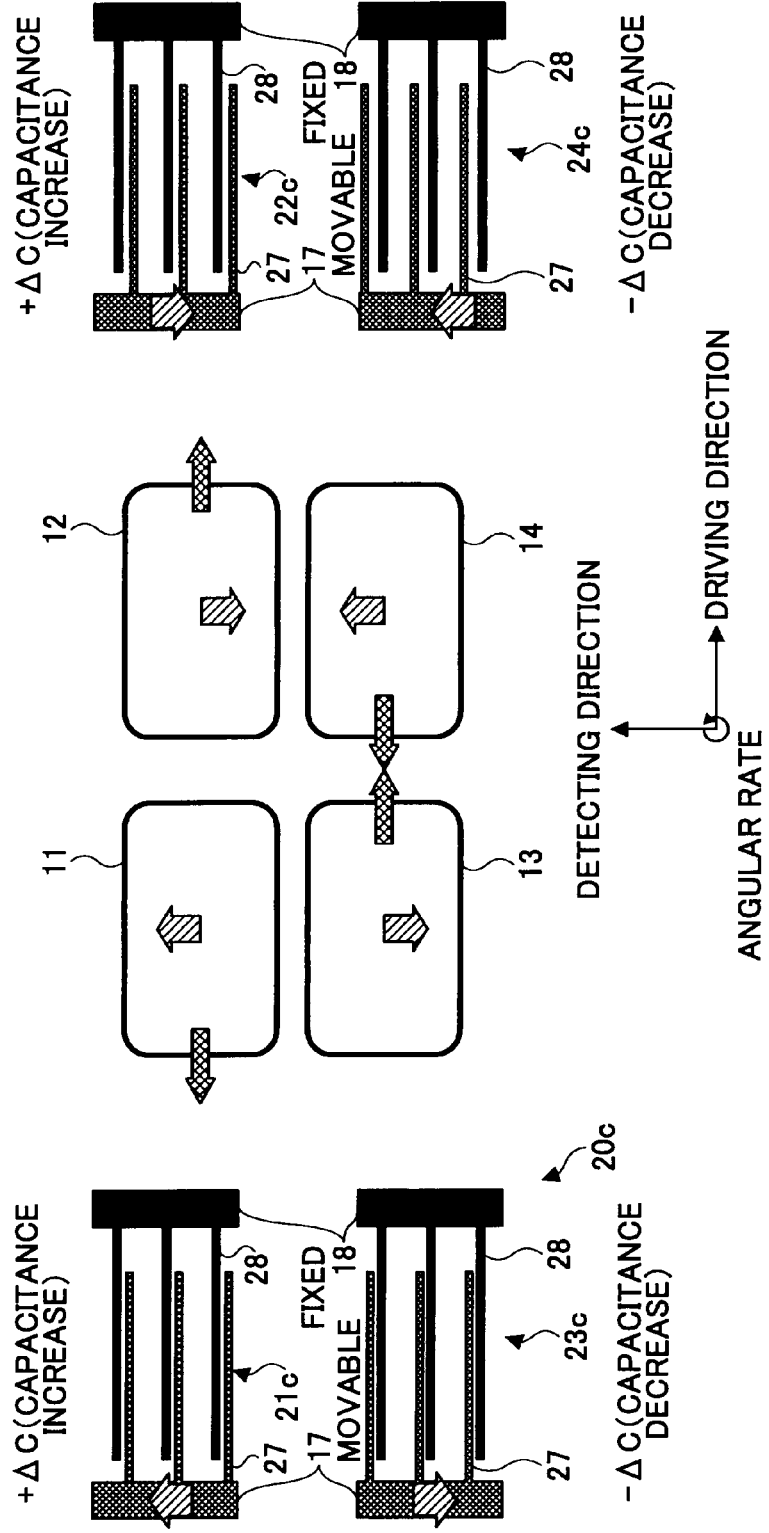
FIG. 18 is an enlarged configuration view of a portion of detection parts of a compound sensor of a eleventh embodiment of the present invention.

FIG. 18 is a view showing a whole configuration of a compound sensor of a eleventh embodiment and a configuration of a part of a detection unit by enlarging. Since the whole configuration drawing is similar to the ninth embodiment and tenth embodiment including a driving phase and a Coriolis force direction, the descriptions are omitted.

In the compound sensor of the eleventh embodiment, a first detection part 21c and a second detection part 22c are configured to have the same electrode arrangement structure where fixed electrodes 18 are above movable electrodes 17 in a detecting direction, and a third detection part 23c and a fourth detection part 24c have an electrode arrangement structure where the movable electrodes 17 are above the fixed electrodes 18. Moreover, the first and third detection parts 21c, 23c and the second and fourth detection parts 22c, 24c have different electrode arrangement structures from each other.

In other words, the compound sensor of the eleventh embodiment is similar to the compound sensor of the tenth embodiment in that the first detection part 21c and second detection part 22c are paired and the third detection part 23c and fourth detection part 24c are paired, but is different from the compound sensor of the tenth embodiment in that an arrangement relationship between the movable electrodes 27 and fixed electrodes 28 are opposite.

Thus, the vertical relationship between the movable electrodes 27 and the fixed electrodes 28 can be modified variously according to intended purpose.

Here, if C1 through c4 and the (±ΔC) are defined, the total amount of the whole capacitance change becomes as follows.

$$(C1+C2)-(C3+C4)=2\Delta C-(-2\Delta C)=4\Delta C$$

It is found that the angular rate can be also readily detected.

In this manner, according to the compound sensor of the eleventh embodiment, it is possible to realize both of space-saving and high S/N, setting pairs different from driving units.

Thus, as described in the first embodiment through eleventh embodiments, according to the compound sensor of the present invention, the angular rate, acceleration, angular acceleration and centrifugal force can be detected separately and individually, and high-accuracy physical amount detection can be performed.

Furthermore, the high-accuracy detection can be performed at high S/N, keeping space-saving.

Here, the first through eleventh embodiments can be combined in a scope without contradicting each other. For example, various arrangements shown in the second through seventh embodiments and the descriptions of the detection parts 20, 20a to 20c shown in the eighth through eleventh embodiments can be practiced by combining with each other.

The present invention is applicable to a sensor that measures a physical amount, in particular, to a compound sensor that detects angular rate, acceleration, angular acceleration and centrifugal force of a mobile object such as a vehicle by being mounted on the mobile object.

The invention claimed is:

1. A compound sensor comprising:
a first unit including first and second oscillators symmetrically disposed to each other and being able to be displaced in a driving direction and a detecting direction;
a second unit including third and fourth oscillators symmetrically disposed to each other and being able to be displaced in the driving direction and the detecting direction;
a drive unit configured to drive the first, second, third and fourth oscillators so as to oscillate the first and second oscillators in opposite phase to each other, and the third and fourth oscillators in opposite phase to each other, and so as to oscillate the first unit and the second unit in opposite phase to each other;
a detection unit configured to detect displacements of the first, second, third and fourth oscillators in the detecting direction; and
a processing unit configured to calculate an acceleration, an angular rate, an angular acceleration and a centrifugal force respectively and independently from the displacements of the first, second, third and fourth oscillators,
wherein the first unit and the second unit respectively further include a same number of additional oscillators other than the first, second, third and fourth oscillators, and
wherein the drive unit drives the additional oscillators so as to make oscillators in opposite phase a same number if a total number of the oscillators included in the first unit and the second unit is even after the additional oscillators are added, and so as to oscillate the additional oscillators opposite in phase to a nearest disposed oscillator within the first unit and the second unit if the total number of the oscillators included in the first unit and the second unit is odd after the additional oscillators are added.

2. A compound sensor comprising:
a first unit including first and second oscillators symmetrically disposed to each other and being able to be displaced in a driving direction and a detecting direction;
a second unit including third and fourth oscillators symmetrically disposed to each other and being able to be displaced in the driving direction and the detecting direction;
a drive unit configured to drive the first, second, third and fourth oscillators so as to oscillate the first and second oscillators in opposite phase to each other, and the third and fourth oscillators in opposite phase to each other, and so as to oscillate the first unit and the second unit in opposite phase to each other;
a detection unit configured to detect displacements of the first, second, third and fourth oscillators in the detecting direction; and
a processing unit configured to calculate an acceleration, an angular rate, an angular acceleration and a centrifugal force respectively and independently from the displacements of the first, second, third and fourth oscillators,
wherein the drive unit and the detection unit respectively include first, second, third and fourth drive parts, and first, second, third and fourth detection parts respectively corresponding to the first, second, third and fourth oscillators,
wherein the first, second, third and fourth detection parts respectively include detection electrodes to detect the displacements by increase and decrease of capacitance, the detection electrodes being made of comb-like plural fixed electrodes fixed to a supporting medium and plural movable electrodes disposed alternately opposite to each other; and
wherein a positional relation in the detecting direction of an alternate arrangement between the fixed electrodes and the movable electrodes has an arrangement where the plural fixed electrodes and the plural movable electrodes generate only one of increase and decrease of the capacitance when the displacements occur, and has an arrangement where the detection parts corresponding to oscillators driven in opposite phase by the drive unit among the first, second, third and fourth oscillators make pairs of a common arrangement and each of the pairs has a different arrangement.

3. The compound sensor as claimed in claim 2,
wherein if the first and third oscillators are arranged on a same side in the driving direction, and the second and fourth oscillators are disposed on a same side in the driving direction, and the first and second detection parts make a pair, and the third and fourth detection parts make a pair respectively,
the detection electrodes of the first and third detection parts are arranged only to increase or decrease capacitance when the first and third oscillators are displaced, and
the detection electrodes of the second and fourth detection parts are arranged only to change the capacitance in opposite to capacitance change of the detection electrodes of the first and third detection parts.

4. The compound sensor as claimed in claim 2,
wherein if the first and third oscillators are arranged on a same side in the driving direction, and the second and fourth oscillators are disposed on a same side in the driving direction, and the first and second detection parts make a pair, and the third and fourth detection parts make a pair respectively,
the detection electrodes of the first and second detection parts are arranged only to increase or decrease capacitance when the first and second oscillators are displaced, and
the detection electrodes of the third and fourth detection parts are arranged only to change the capacitance in opposite to capacitance change of the detection electrodes of the first and second detection parts.

* * * * *